US012786631B2

(12) United States Patent
Jeong et al.

(10) Patent No.: US 12,786,631 B2
(45) Date of Patent: Nov. 3, 2026

(54) WIRELESS AUDIO RECEPTION APPARATUS, WIRELESS AUDIO TRANSMISSION APPARATUS, AND WIRELESS AUDIO OUTPUT SYSTEM COMPRISING SAME

(71) Applicant: LG ELECTRONICS INC., Seoul (KR)

(72) Inventors: Byounghak Jeong, Seoul (KR); Suhyun Park, Seoul (KR); Ukheon Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 18/722,046

(22) PCT Filed: Dec. 21, 2021

(86) PCT No.: PCT/KR2021/019483
§ 371 (c)(1),
(2) Date: Jun. 20, 2024

(87) PCT Pub. No.: WO2023/120757
PCT Pub. Date: Jun. 29, 2023

(65) Prior Publication Data

US 2025/0063301 A1 Feb. 20, 2025

(51) Int. Cl.
*H04R 3/12* (2006.01)
*H04L 5/00* (2006.01)
(Continued)

(52) U.S. Cl.
CPC ............. *H04R 3/12* (2013.01); *H04L 5/0053* (2013.01); *H04W 28/06* (2013.01); *H04W 76/14* (2018.02); *H04W 76/15* (2018.02)

(58) Field of Classification Search
CPC ........ H04R 3/12; H04W 76/15; H04W 76/14; H04W 28/06; H04L 5/0053
See application file for complete search history.

(56) References Cited

U.S. PATENT DOCUMENTS 11,653,148 B2 * 5/2023 Tsoi ........................ H04S 7/307 381/104
11,893,052 B2 * 2/2024 Sanders ............. G06F 16/4387
(Continued)

FOREIGN PATENT DOCUMENTS

KR 10-2005-0073114 7/2005
KR 10-2008-0007058 1/2008
(Continued)

OTHER PUBLICATIONS

PCT International Application No. PCT/KR2021/019483, International Search Report dated Sep. 8, 2022, 4 pages.
(Continued)

*Primary Examiner* — Oyesola C Ojo
(74) *Attorney, Agent, or Firm* — LEE, HONG, DEGERMAN, KANG & WAIMEY

(57) ABSTRACT

A wireless audio receiving device of the present disclosure includes a first communication module to wirelessly receive a first audio signal based on a first communication standard of a first frequency band; a second communication module to wirelessly receive a second audio signal based on a second communication standard of a second frequency band greater than the first frequency band; and a sound output device to output a first or a second sound corresponding to the first or second audio signal, wherein the first communication module is configured to receive first signal data through a first channel, and separately receive first audio data through a second channel, and wherein the second communication module is configured to receive second
(Continued)

signal data and second audio data separately through the same channel.

17 Claims, 18 Drawing Sheets

(51) Int. Cl.

| | |
|---|---|
| ***H04W 28/06*** | (2009.01) |
| ***H04W 76/14*** | (2018.01) |
| ***H04W 76/15*** | (2018.01) |

(56) References Cited

U.S. PATENT DOCUMENTS

| | | | | |
|---|---|---|---|---|
| 2005/0152392 | A1* | 7/2005 | Lim | H04L 12/1886 370/493 |
| 2007/0009108 | A1* | 1/2007 | Furge | H03F 3/181 381/86 |
| 2008/0013519 | A1* | 1/2008 | Kwon | H04J 3/1682 370/345 |
| 2010/0039960 | A1* | 2/2010 | Sugaya | H04W 72/20 370/255 |
| 2013/0251180 | A1* | 9/2013 | Solum | H04R 25/305 381/315 |
| 2015/0326984 | A1* | 11/2015 | Haubrich | H04R 25/554 381/315 |
| 2016/0119902 | A1* | 4/2016 | Cheong | H04W 48/12 370/329 |
| 2017/0357477 | A1* | 12/2017 | Im | H04R 3/12 |
| 2019/0191472 | A1* | 6/2019 | Nam | H04W 64/003 |
| 2020/0226423 | A1* | 7/2020 | Ngo Dinh | G06F 18/2413 |
| 2021/0219360 | A1* | 7/2021 | Ferrari | H04R 25/554 |
| 2021/0360361 | A1* | 11/2021 | Farrar | H04B 11/00 |
| 2021/0400403 | A1* | 12/2021 | Chen | H04R 1/1091 |
| 2021/0400411 | A1* | 12/2021 | Lee | H04W 56/001 |
| 2022/0131822 | A1* | 4/2022 | Jon | G06F 3/04842 |
| 2023/0016757 | A1* | 1/2023 | Xu | H04B 17/318 |

FOREIGN PATENT DOCUMENTS

| | | |
|---|---|---|
| KR | 10-2008-0022180 | 3/2018 |
| KR | 10-2019-0071238 | 6/2019 |
| KR | 10-2021-0152023 | 12/2021 |

OTHER PUBLICATIONS

Korean Intellectual Property Office Application No. 10-2024-7021991, Notice of Allowance dated May 20, 2026, 3 pages.

* cited by examiner

WIRELESS AUDIO RECEPTION APPARATUS, WIRELESS AUDIO TRANSMISSION APPARATUS, AND WIRELESS AUDIO OUTPUT SYSTEM COMPRISING SAME

CROSS-REFERENCE TO RELATED APPLICATION(S)

This application is the National Stage filing under 35 U.S.C. 371 of International Application No. PCT/KR2021/019483, filed on Dec. 21, 2021, the contents of which is hereby incorporated by reference herein in its entirety.

BACKGROUND

1. Field

This disclosure relates to a wireless audio receiving device, a wireless audio transmitting device, and a wireless audio output system including the same, and more particularly, to a wireless audio receiving device, a wireless audio transmitting device, and a wireless audio output system including the same capable of stably receiving audio wirelessly and output sound even in complex wireless environments.

2. Description of the Related Art

A wireless audio receiving device wirelessly receives an audio signal from an external wireless audio transmitting device, converts the received audio signal into sound, and outputs it.

U.S. Patent Publication No. US20080310394 (hereinafter, referred to as "prior literature") discloses a multi-session Bluetooth communication method and system using a multiple physical Phy layer, and discloses that each of a plurality of Bluetooth sessions utilizes a physical PHY layer or MAC layer such as WLAN, and ultra-wideband UWB to transmit or receive data.

However, according to prior literature, there is a disadvantage that it is difficult to distinguish between signal data and audio data in WLAN, ultra-wideband UWB, etc. In addition, as an audio service, there is a disadvantage that unicast and broadcast cannot be applied separately.

SUMMARY

The disclosure has been made in view of the above problems, and may provide a wireless audio receiving device, a wireless audio transmitting device, and a wireless audio output system including the same that can stably receive audio wirelessly and output sound even when the wireless environment is complex.

The disclosure may further provide a wireless audio receiving device, a wireless audio transmitting device, and a wireless audio output system including the same that can distinguish between signal data and audio data in a first communication module and a second communication module.

The disclosure may further provide a wireless audio receiving device, a wireless audio transmitting device, and a wireless audio output system including the same that can operate by separating into unicast and broadcast The disclosure may further provide a wireless audio receiving device, a wireless audio transmitting device, and a wireless audio output system including the same that can verify whether it is possible to support ultra-wideband UWB wireless audio, and can transmit or receive audio data wirelessly.

In accordance with an aspect of the present disclosure, a wireless audio receiving device and a wireless audio output system including the same include: a first communication module configured to wirelessly receive a first audio signal based on a first communication standard of a first frequency band; a second communication module configured to wirelessly receive a second audio signal based on a second communication standard of a second frequency band greater than the first frequency band; and a sound output device configured to output a first sound corresponding to the first audio signal from the first communication module or a second sound corresponding to the second audio signal from the second communication module, wherein the first communication module is configured to receive first signal data through a first channel, and separately receive first audio data through a second channel, and wherein the second communication module is configured to receive second signal data and second audio data separately through the same channel.

Meanwhile, a beacon message received from the second communication module includes unicast information or broadcast information.

Meanwhile, in response to unicast information being included in the received beacon message, the second communication module is configured to transmit association request information to a wireless audio transmitting device, and receive association response information from the wireless audio transmitting device.

Meanwhile, the second communication module is configured to distinguish the second signal data and the second audio data, based on identification information in a header among the received second audio signal.

Meanwhile, the second communication module is configured to distinguish the second signal data or the second audio data, based on identification information in a media access control header or a physical header among the received second audio signal.

Meanwhile, the second communication module is configured to, in response to receiving the second signal data, extract encoding or decoding information of the second standard, receive the second audio data after the second signal data, and set a play time of the second audio data, based on the extracted encoding or decoding information.

Meanwhile, the wireless audio receiving device and the wireless audio output system including the same further include a processor configured to reproduce an audio signal from the first communication module or the second communication module, wherein the processor is configured to reproduce the second audio data, based on decoding information and a set play time from the second communication module.

Meanwhile, in response to receiving the first audio signal from the first communication module and then receiving the second audio signal from the second communication module, Host Control Interface (HCl) data of the first communication standard is mapped to a MAC Layer Management Entity (MLME) interface of the second communication standard, and Asynchronous Connection-Less (ACL) data and audio data of the first communication standard are mapped to a MAC Common Part Sublayer (MCPS) interface of the second communication standard.

Meanwhile, in response to receiving the first audio signal from the first communication module and then receiving the second audio signal from the second communication module, data of the first communication standard is mapped to data of the second communication standard by using an adaptation layer.

Meanwhile, in response to receiving the second audio signal, the second communication module is configured to receive the second signal data in a contention access period of a beacon interval, and receive the second audio data in a contention free period of the beacon period.

In accordance with another aspect of the present disclosure, a wireless audio transmitting device and a wireless audio output system including the same include a first communication module configured to wirelessly transmit a first audio signal based on a first communication standard of a first frequency band; and a second communication module configured to wirelessly transmit a second audio signal based on a second communication standard of a second frequency band greater than the first frequency band, wherein the first communication module is configured to transmit first signal data through a first channel, and separately transmit first audio data through a second channel, and the second communication module is configured to transmit second signal data and second audio data separately through the same channel.

Meanwhile, a beacon message transmitted from the second communication module includes unicast information or broadcast information.

Meanwhile, in response to unicast information being included in the transmitted beacon message, the second communication module is configured to receive association request information from a wireless audio receiving device, and transmit association response information to the wireless audio receiving device.

Meanwhile, the second communication module adds identification information within a media access control header or a physical header to distinguish whether the transmitted second audio signal is the second signal data or the second audio data.

Meanwhile, in response to transmitting the first audio signal from the first communication module and then transmitting the second audio signal from the second communication module, Host Control Interface (HCl) data of the first communication standard is mapped to a MAC Layer Management Entity (MLME) interface of the second communication standard, and Asynchronous Connection-Less (ACL) data and audio data of the first communication standard are mapped to a MAC Common Part Sublayer (MCPS) interface of the second communication standard.

Meanwhile, in response to transmitting the first audio signal from the first communication module and then transmitting the second audio signal from the second communication module, data of the first communication standard is mapped to data of the second communication standard by using an adaptation layer.

Meanwhile, in response to transmitting the second audio signal, the second communication module is configured to transmit the second signal data in a contention access period of a beacon interval, and transmit the second audio data in a contention free period of the beacon period.

Meanwhile, the first communication module is configured to transmit first signal data and transmits identification information within the first signal data to the second communication module, and the second communication module is configured to separately transmit the second signal data within the second audio signal, based on the identification information from the first communication module.

Meanwhile, the first communication module is configured to transmit first audio data and transmits identification information within the first audio data to the second communication module, and the second communication module is configured to separately transmit the second audio data within the second audio signal, based on the identification information from the first communication module.

Meanwhile, in response to receiving a security activation value from a wireless audio receiving device and if it matches, the second communication module is configured to generate a key, and encrypt and transmit the second audio data by using the generated key.

Effects of the Disclosure

A wireless audio receiving device and the wireless audio output system including the same according to an embodiment of the present disclosure include: a first communication module configured to wirelessly receive a first audio signal based on a first communication standard of a first frequency band; a second communication module configured to wirelessly receive a second audio signal based on a second communication standard of a second frequency band greater than the first frequency band; and a sound output device configured to output a first sound corresponding to the first audio signal from the first communication module or a second sound corresponding to the second audio signal from the second communication module, wherein the first communication module is configured to receive first signal data through a first channel, and separately receive first audio data through a second channel, and wherein the second communication module is configured to receive second signal data and second audio data separately through the same channel. Accordingly, even in complex wireless environments, it is possible to stably receive audio wirelessly and output sound. In addition, in the first communication module and the second communication module, signal data and audio data can be distinguished, thereby stably receiving audio wirelessly and outputting sound.

Meanwhile, a beacon message received from the second communication module includes unicast information or broadcast information. Accordingly, it is possible to operate to distinguish unicast and broadcast.

Meanwhile, in response to unicast information being included in the received beacon message, the second communication module is configured to transmit association request information to a wireless audio transmitting device, and receive association response information from the wireless audio transmitting device. Accordingly, it is possible to operate to distinguish unicast and broadcast.

Meanwhile, the second communication module is configured to distinguish the second signal data and the second audio data, based on identification information in a header among the received second audio signal. Accordingly, signal data and audio data can be distinguished, thereby stably receiving audio wirelessly and outputting sound.

Meanwhile, the second communication module is configured to distinguish the second signal data or the second audio data, based on identification information in a media access control header or a physical header among the received second audio signal. Accordingly, signal data and audio data can be distinguished, thereby stably receiving audio wirelessly and outputting sound.

Meanwhile, the second communication module is configured to, in response to receiving the second signal data, extract encoding or decoding information of the second standard, receive the second audio data after the second signal data, and set a play time of the second audio data, based on the extracted encoding or decoding information.

Accordingly, signal data and audio data can be distinguished, thereby stably receiving audio wirelessly and outputting sound.

Meanwhile, the wireless audio receiving device and the wireless audio output system including the same further include a processor configured to reproduce an audio signal from the first communication module or the second communication module, wherein the processor is configured to reproduce the second audio data, based on decoding information and a set play time from the second communication module. Accordingly, signal data and audio data can be distinguished, thereby stably receiving audio wirelessly and outputting sound.

Meanwhile, in response to receiving the first audio signal from the first communication module and then receiving the second audio signal from the second communication module, Host Control Interface (HCl) data of the first communication standard is mapped to a MAC Layer Management Entity (MLME) interface of the second communication standard, and Asynchronous Connection-Less (ACL) data and audio data of the first communication standard are mapped to a MAC Common Part Sublayer (MCPS) interface of the second communication standard. Accordingly, signal data and audio data can be distinguished, thereby stably receiving audio wirelessly and outputting sound.

Meanwhile, in response to receiving the first audio signal from the first communication module and then receiving the second audio signal from the second communication module, data of the first communication standard is mapped to data of the second communication standard by using an adaptation layer. Accordingly, signal data and audio data can be distinguished, thereby stably receiving audio wirelessly and outputting sound.

Meanwhile, in response to receiving the second audio signal, the second communication module is configured to receive the second signal data in a contention access period of a beacon interval, and receive the second audio data in a contention free period of the beacon period. Accordingly, signal data and audio data can be distinguished, thereby stably receiving audio wirelessly and outputting sound.

In accordance with another aspect of the present disclosure, a wireless audio transmitting device and a wireless audio output system including the same include a first communication module configured to wirelessly transmit a first audio signal based on a first communication standard of a first frequency band; and a second communication module configured to wirelessly transmit a second audio signal based on a second communication standard of a second frequency band greater than the first frequency band, wherein the first communication module is configured to transmit first signal data through a first channel, and separately transmit first audio data through a second channel, and the second communication module is configured to transmit second signal data and second audio data separately through the same channel. Accordingly, even in complex wireless environments, it is possible to stably transmit audio wirelessly. In addition, it is possible to transmit signal data and audio data separately.

Meanwhile, a beacon message transmitted from the second communication module includes unicast information or broadcast information. Accordingly, it is possible to operate to distinguish unicast and broadcast.

Meanwhile, in response to unicast information being included in the transmitted beacon message, the second communication module is configured to receive association request information from a wireless audio receiving device, and transmit association response information to the wireless audio receiving device. Accordingly, it is possible to operate to distinguish unicast and broadcast. In addition, it is checked that ultra-wideband (UWB) wireless audio support is available, and audio data can be transmitted wirelessly.

Meanwhile, the second communication module adds identification information within a media access control header or a physical header to distinguish whether the transmitted second audio signal is the second signal data or the second audio data. Accordingly, it is possible to operate to distinguish unicast and broadcast.

Meanwhile, in response to transmitting the first audio signal from the first communication module and then transmitting the second audio signal from the second communication module, Host Control Interface (HCl) data of the first communication standard is mapped to a MAC Layer Management Entity (MLME) interface of the second communication standard, and Asynchronous Connection-Less (ACL) data and audio data of the first communication standard are mapped to a MAC Common Part Sublayer (MCPS) interface of the second communication standard. Accordingly, signal data and audio data can be distinguished, thereby stably transmitting audio wirelessly.

Meanwhile, in response to transmitting the first audio signal from the first communication module and then transmitting the second audio signal from the second communication module, data of the first communication standard is mapped to data of the second communication standard by using an adaptation layer. Accordingly, signal data and audio data can be distinguished, thereby stably transmitting audio wirelessly.

Meanwhile, in response to transmitting the second audio signal, the second communication module is configured to transmit the second signal data in a contention access period of a beacon interval, and transmit the second audio data in a contention free period of the beacon period. Accordingly, signal data and audio data can be distinguished, thereby stably transmitting audio wirelessly.

Meanwhile, the first communication module is configured to transmit first signal data and transmits identification information within the first signal data to the second communication module, and the second communication module is configured to separately transmit the second signal data within the second audio signal, based on the identification information from the first communication module. Accordingly, signal data and audio data can be distinguished, thereby stably transmitting audio wirelessly.

Meanwhile, the first communication module is configured to transmit first audio data and transmits identification information within the first audio data to the second communication module, and the second communication module is configured to separately transmit the second audio data within the second audio signal, based on the identification information from the first communication module. Accordingly, signal data and audio data can be distinguished, thereby stably transmitting audio wirelessly.

Meanwhile, in response to receiving a security activation value from a wireless audio receiving device and if it matches, the second communication module is configured to generate a key, and encrypt and transmit the second audio data by using the generated key. Accordingly, it is possible to stably transmit audio wirelessly based on security.

DETAILED DESCRIPTION OF THE PREFERRED EMBODIMENTS

Hereinafter, the present disclosure will be described in more detail with reference to the drawings.

The suffixes such as "module" and "unit" may be used to refer to elements or components. Use of such suffixes herein is merely intended to facilitate description of the specification, and the suffixes do not have any special meaning or function. Accordingly, the "module" and "unit" may be used interchangeably.

FIGS. 1A to 1E are diagrams illustrating a wireless audio system including a wireless audio receiving device and a wireless audio transmitting device according to various embodiments of the present disclosure.

Figure 1A:
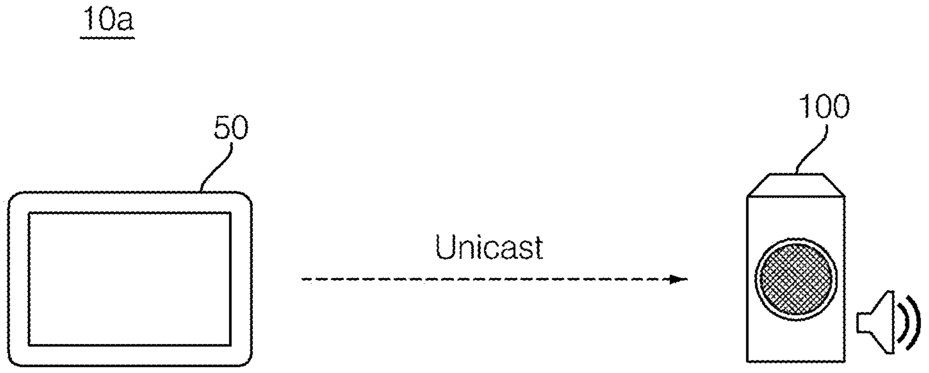
FIGS. 1A to 1E are diagrams illustrating a wireless audio system including a wireless audio receiving device and a wireless audio transmitting device according to various embodiments of the present disclosure.

First, FIG. 1A illustrates a wireless audio system 10*a* according to an embodiment of the present disclosure.

Referring to FIG. 1A, the wireless audio system 10*a* according to an embodiment of the present disclosure may include a wireless audio transmitting device 50 and a wireless audio receiving device 100.

In particular, in the wireless audio system 10*a*, the wireless audio transmitting device 50 and the wireless audio receiving device 100 may correspond one-to-one, based on a unicast method.

The wireless audio transmitting device 50 may include a first communication module 135*a* wirelessly transmitting a first audio signal based on a first communication standard of a first frequency band, and a second communication module 135*b* wirelessly transmitting a second audio signal based on a second communication standard of a second frequency band greater than the first frequency band.

Meanwhile, the wireless audio receiving device 100 may include a first communication module 135*a* wirelessly receiving a first audio signal according to the first communication standard of a first frequency band, and a second communication module 135*b* wirelessly receiving a second audio signal according to the second communication standard of a second frequency band greater than the first frequency band.

Accordingly, even in complex wireless environments, it is possible to stably receive audio wirelessly and output sound. In addition, the first communication module 135*a* and the second communication module 135*b* can distinguish between signal data and audio data, thereby stably receiving audio wirelessly and outputting sound.

At this time, the wireless audio transmitting device 50 may be a mobile terminal such as a mobile phone or tablet.

Figure 1B:
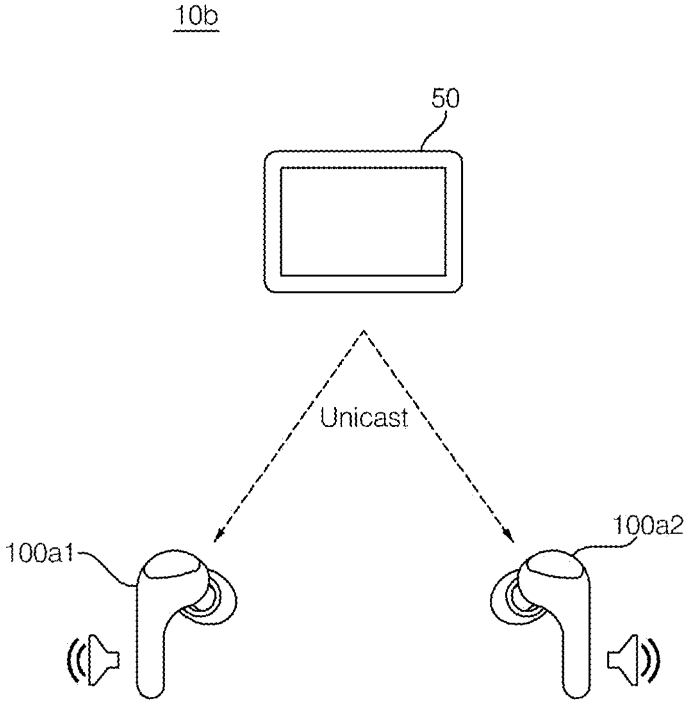

Next, FIG. 1B illustrates a wireless audio system 10*b* according to another embodiment of the present disclosure.

Referring to FIG. 1B, the wireless audio system 10*b* according to another embodiment of the present disclosure may include a wireless audio transmitting device 50 and a plurality of wireless audio receiving devices 100*a*1 and 100*a*2.

In particular, the wireless audio system 10*b* may include a wireless audio transmitting device 50 and a plurality of wireless audio receiving devices 100*a*1 and 100*a*2, based on a unicast method.

For example, when wireless audio signals of a first channel to a second channel are output from the wireless audio transmitting device 50, a wireless audio signal of the first channel may be transmitted to a first wireless audio receiving device 100*a*1 among a plurality of wireless audio receiving devices 100*a*1 and 100*a*2, and a wireless audio signal of the second channel may be transmitted to a second wireless audio receiving device 100*a*2.

Accordingly, even though the wireless environment is complicated, it is possible to stably receive audio wirelessly and output sound. In addition, the first communication module 135*a* and the second communication module 135*b* in each wireless audio receiving device 100*a*1 to 100*a*2 can distinguish between signal data and audio data, thereby stably receiving audio wirelessly and outputting sound.

At this time, the plurality of wireless audio receiving devices 100*a*1 and 100*a*2 may be left and right wireless audio receiving devices, respectively.

Figure 1C:
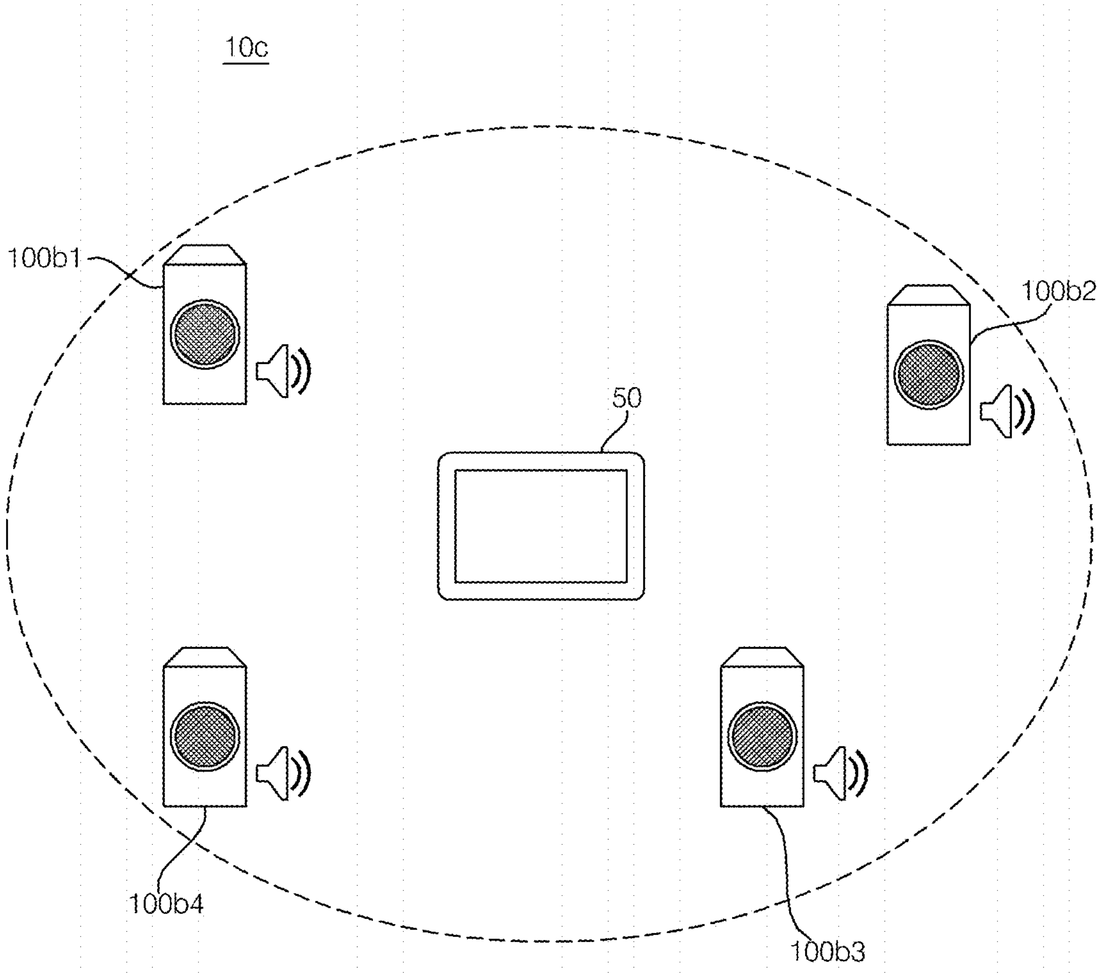

Next, FIG. 1C illustrates a wireless audio system 10*c* according to another embodiment of the present disclosure.

Referring to FIG. 1C, a wireless audio system 10*c* according to another embodiment of the present disclosure may include a wireless audio transmitting device 50 and a plurality of wireless audio receiving devices 100*b*1 to 100*b*4.

In particular, the wireless audio system 10*c* may include a wireless audio transmitting device 50 and a plurality of wireless audio receiving devices 100*b*1 to 100*b*4, based on a broadcast method.

For example, when wireless audio signals of first to fourth channels are output from the wireless audio transmitting device 50, a wireless audio signal of a first channel may be transmitted to a first wireless audio receiving device 100*b*1 among a plurality of wireless audio receiving devices 100*b*1 to 100*b*4, a wireless audio signal of a second channel may be transmitted to a second wireless audio receiving device 100*b*2, a wireless audio signal of a third channel may be transmitted to a third wireless audio receiving device 100*b*3, and a wireless audio signal of a fourth channel may be transmitted to a fourth wireless audio receiving device 100*b*4.

Accordingly, even though the wireless environment is complicated, it is possible to stably receive audio wirelessly and output sound. In addition, the first communication module 135*a* and the second communication module 135*b* in each wireless audio receiving device 100*b*1 to 100*b*4 can distinguish between signal data and audio data, thereby stably receiving audio wirelessly and outputting sound.

Figure 1D:
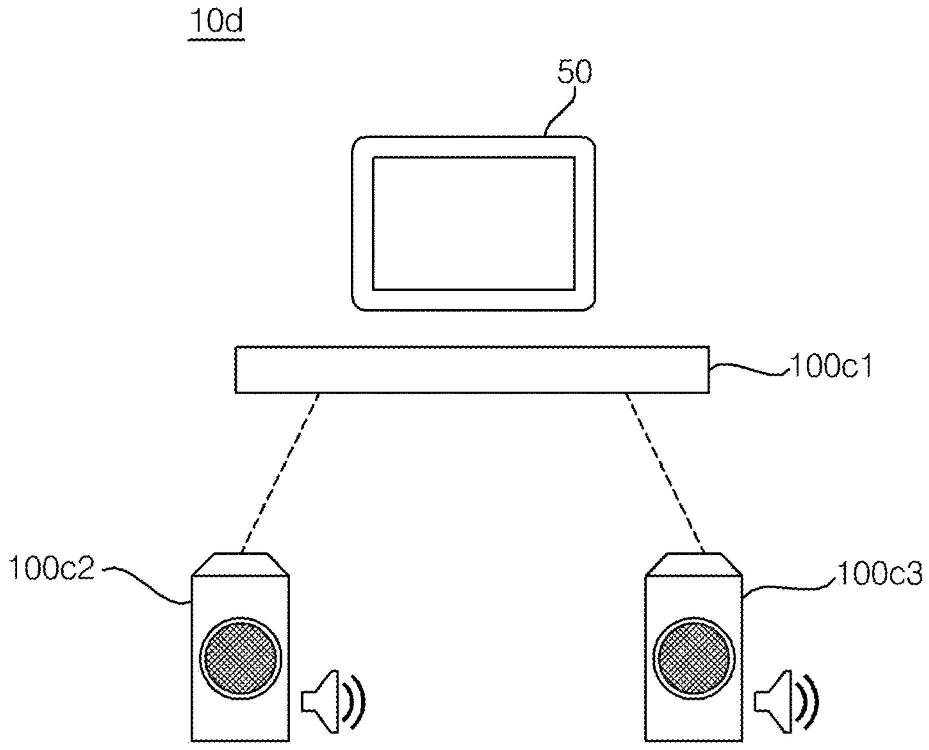

Next, FIG. 1D illustrates a wireless audio system 10*d* according to another embodiment of the present disclosure.

Referring to FIG. 1D, the wireless audio system 10*d* according to another embodiment of the present disclosure may include a wireless audio transmitting device 50 and a plurality of wireless audio receiving devices 100*c*1 to 100*c*3.

In particular, the wireless audio system 10*d* may include a wireless audio transmitting device 50 and a plurality of wireless audio receiving devices 100*c*1 to 100*c*3, based on a unicast method.

For example, when wireless audio signals of first to third channels are output from the wireless audio transmitting device 50, a wireless audio signal of a first channel may be transmitted to a first wireless audio receiving device 100*c*1 among a plurality of wireless audio receiving devices 100*c*1 to 100*c*3, a wireless audio signal of a second channel may be transmitted to a second wireless audio receiving device 100*c*2, and a wireless audio signal of a third channel may be transmitted to a third wireless audio receiving device 100*c*3.

As another example, when wireless audio signals of first to third channels are output from the wireless audio transmitting device 50, wireless audio signals of a first channel to a third channel may be transmitted to a first wireless audio receiving device 100*c*1 among a plurality of wireless audio receiving devices 100*c*1 to 100*c*3, the first wireless audio receiving device 100*c*1 may output wireless audio signals of second to third channels, a wireless audio signal of the second channel may be transmitted to a second wireless audio receiving device 100*c*2, and a wireless audio signal of the third channel may be transmitted to a third wireless audio receiving device 100*c*3.

Accordingly, even though the wireless environment is complicated, it is possible to stably receive audio wirelessly and output sound. In addition, the first communication module 135*a* and the second communication module 135*b* in each wireless audio receiving device 100*c*1 to 100*c*3 can distinguish between signal data and audio data, thereby stably receiving audio wirelessly and outputting sound.

Figure 1E:
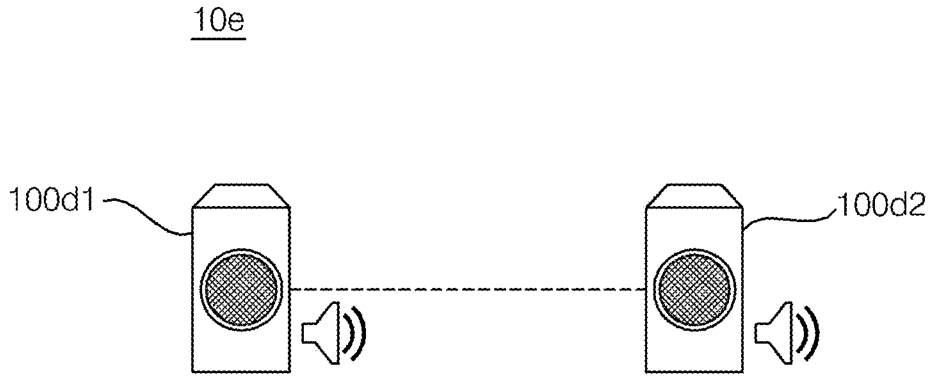

Next, FIG. 1E illustrates a wireless audio system 10*e* according to another embodiment of the present disclosure.

Referring to FIG. 1E, a wireless audio system 10*e* according to another embodiment of the present disclosure may include a plurality of wireless audio receiving devices 100*d*1 and 100*d*2.

In particular, the wireless audio system 10*e* may include a plurality of wireless audio receiving devices 100*d*1 and 100*d*2, based on a unicast method.

For example, when a wireless audio signal is output from the first wireless audio receiving device 100*d*1, the wireless audio signal may be transmitted to the second wireless audio receiving device 100*d*2.

Accordingly, even though the wireless environment is complicated, it is possible to stably receive audio wirelessly and output sound. In addition, the first communication module 135*a* and the second communication module 135*b* in each wireless audio receiving device 100*d*1 to 100*d*2 can distinguish between signal data and audio data, thereby stably receiving audio wirelessly and outputting sound.

Meanwhile, the wireless audio transmitting device 50 illustrated in FIGS. 1A to 1E may be a mobile terminal, a TV, a monitor, a tablet, a home appliance, a vehicle display device, and the like.

Figure 2:
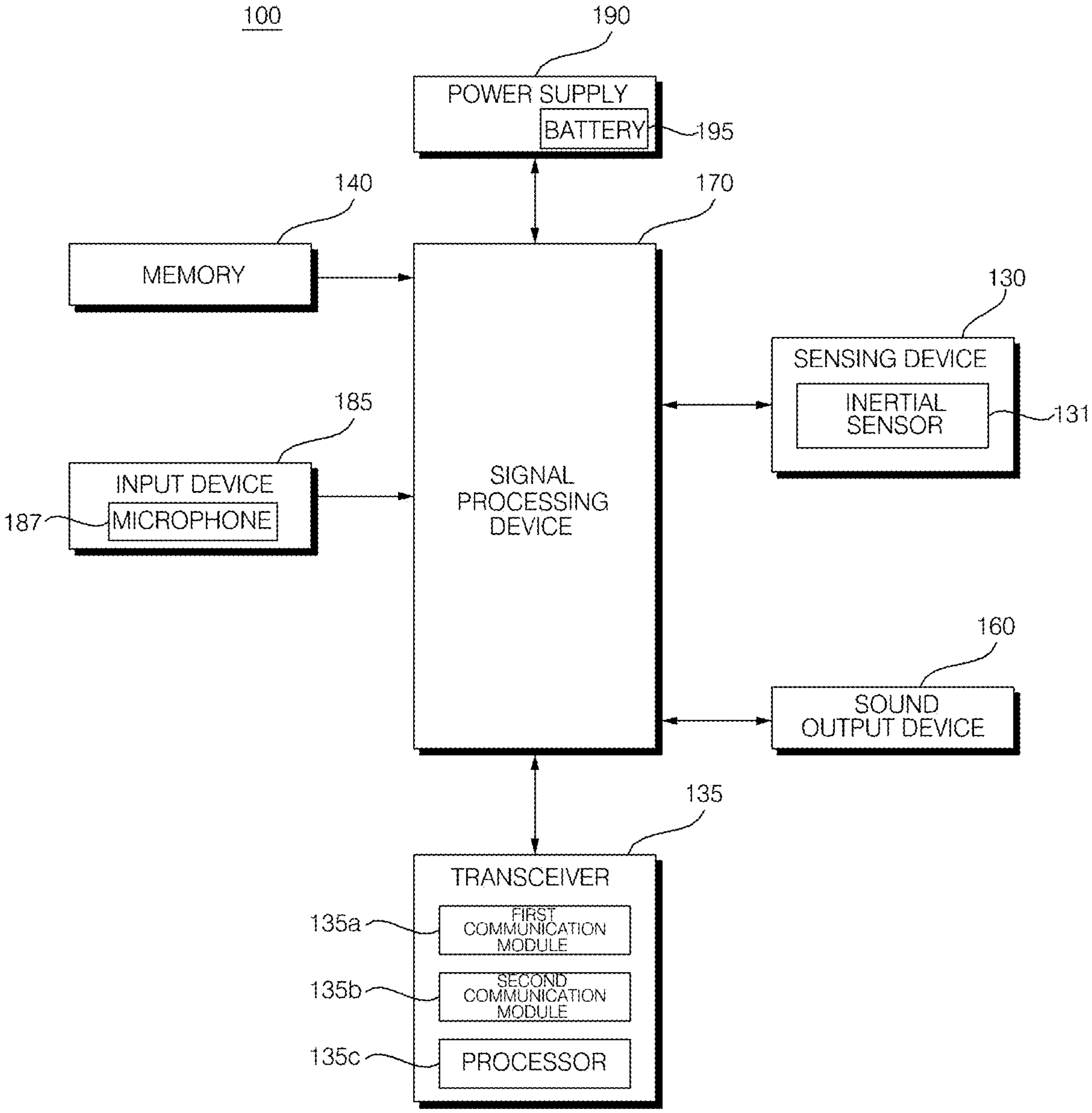
FIG. 2 is an example of an internal block diagram of the wireless audio receiving device of FIGS. 1A to 1E.

FIG. 2 is an example of an internal block diagram of the wireless audio receiving device of FIGS. 1A to 1E.

Referring to FIG. 2, the wireless audio receiving device 100 may include a sensing device 130, a transceiver 135, a memory 140, a sound output device 160, a signal processing device 170, an input device 185, and a power supply 190. When these components are implemented in actual applications, if necessary, two or more components may be combined into one component, or one component may be subdivided into two or more components.

The sensing device 130 may include an inertial sensor 131. The inertial sensor may include an acceleration sensor, a gyro sensor, a gravity sensor, or the like. For example, the acceleration sensor, the gyro sensor, the gravity sensor, or the like may include a 6-axis sensor.

The sensing device 130 may output motion information of the wireless audio receiving device 100, for example, movement information (acceleration information, angular velocity information) or location information based on x, y, z axis.

Meanwhile, the sensing device 130 may include a sensor for obtaining user body information. For example, a blood pressure sensor, a brain wave sensor, or the like may be provided.

Meanwhile, the transceiver 135 may provide an interface for communication with an external device. To this end, the transceiver 135 may include at least one of a mobile communication module (not shown), a wireless Internet module (not shown), a short-distance communication module (not shown), or a GPS module (not shown).

For example, the transceiver 135 may perform IR communication, Bluetooth communication, or WiFi communication, thereby exchanging data with a paired wireless audio transmitting device 50 or transmitting data. In particular, it may receive an audio signal from the paired wireless audio transmitting device 50.

Meanwhile, the transceiver 135 may include a first communication module 135*a* that wirelessly receives a first audio signal according to the first communication standard of a first frequency band, and a second communication module 135*b* that wirelessly receives a second audio signal according to the second communication standard of a second frequency band greater than the first frequency band.

Meanwhile, the first communication module 135*a* receives a first signal data through a first channel CH1, and separately receives a first audio data through a second channel CH2, and the second communication module 135*b* separately receives a second signal data and a second audio data through the same channel CHm.

Accordingly, even though the wireless environment is complicated, it is possible to stably receive audio wirelessly and output sound. In addition, signal data and audio data can be distinguished in the first communication module 135*a* and the second communication module 135*b*, so that audio can be stably received wirelessly and sound can be output.

Meanwhile, the beacon message received by the second communication module 135*b* may include unicast information or broadcast information. Accordingly, it is possible to operate by dividing into unicast and broadcast.

Meanwhile, in response to unicast information being included in the received beacon message, the second communication module 135*b* may transmit association request information to the wireless audio transmitting device 50 or 100, and may receive association response information from the wireless audio transmitting device 50 or 100. Accordingly, it is possible to operate by dividing into unicast and broadcast.

Meanwhile, the second communication module 135*b* may distinguish whether it is the second signal data or the second audio data, based on identification information in the header among the received second audio signal. Accordingly, signal data and audio data can be distinguished, thereby stably receiving audio wirelessly and outputting sound.

Meanwhile, the second communication module 135*b* may distinguish whether it is the second signal data or the second audio data, based on identification information in a media access control (MAC) header or a physical (PHY) header among the received second audio signal. Accordingly, signal data and audio data can be distinguished, thereby stably receiving audio wirelessly and outputting sound.

Meanwhile, in response to receiving the second signal data, the second communication module 135*b* may extract encoding or decoding information of the second standard, and based on the extracted encoding or decoding information, may receive the second audio data after the second signal data, and may set a replay time of the second audio data. Accordingly, signal data and audio data can be distinguished, thereby stably receiving audio wirelessly and outputting sound.

The memory 140 may store programs for processing or controlling the signal processing device 170 in the wireless audio receiving device 100, or may perform a function for temporarily storing input or output data.

The sound output device 160 may output an audio signal processed by the signal processing device 170 in the wireless audio receiving device 100.

Alternatively, the sound output device 160 may output guide information related to the operation of the wireless audio receiving device 100 as an audio signal.

Meanwhile, the sound output device 160 may output a first sound corresponding to the first audio signal from the first communication module 135*a* or a second sound corresponding to the second audio signal from the second communication module 135*b*.

The signal processing device 170 may control the overall operation of the wireless audio receiving device 100 by controlling the operation of each unit in the wireless audio receiving device 100.

Meanwhile, the signal processing device 170 may perform signal processing for an audio signal received from the outside.

Meanwhile, the signal processing device 170 may replay an audio signal from the first communication module 135*a* or the second communication module 135*b*.

Meanwhile, the signal processing device 170 may replay the second audio data, based on the decoding information from the second communication module 135*b* and a set replay time. Accordingly, signal data and audio data can be distinguished, thereby stably receiving audio wirelessly and outputting sound.

Meanwhile, the input device 185 may include a button for initializing the wireless audio receiving device 100, or inputting an operation.

Meanwhile, the input device 185 may include a microphone 187 for sound collection.

Meanwhile, the input device 185 may include a camera (not shown) for capturing images.

For example, as shown in FIG. 2, the input device 185 may include, in the drawing, a power key 185*a* for turning power on or off, a FF/REW key 185*b* for going forward or backward in the reproducing audio, a volume key 185*c* for volume up or down, a pause/play key 185*d* for playing or pausing audio, and the like.

The power supply 190 may supply power required for operation of each component under the control of the signal processing device 170.

In particular, the power supply 190 may include a battery 195 that stores and outputs DC power.

FIGS. 3A to 8B are diagrams for explaining an operation of a wireless audio receiving device or a wireless audio transmitting device according to an embodiment of the present disclosure.

Figure 3A:
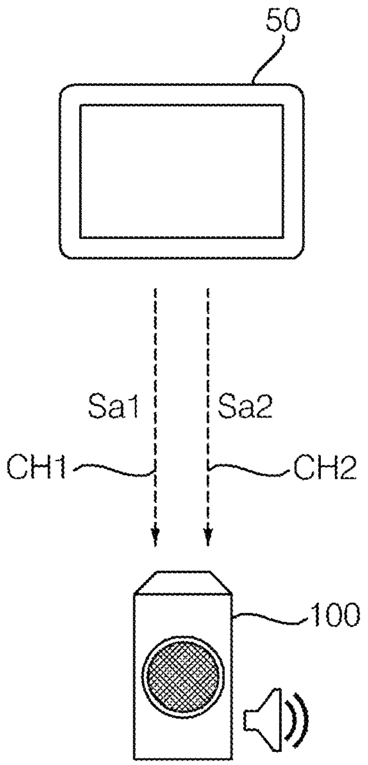
FIGS. 3A to 8B are diagrams for explaining an operation of a wireless audio receiving device or a wireless audio transmitting device according to an embodiment of the present disclosure.

FIG. 3A illustrates that the wireless audio transmitting device 50 outputs a first signal data Sa1 and a first audio data Sa2 to the wireless audio receiving device 100.

Referring to FIG. 3A, the wireless audio transmitting device 50 wirelessly outputs the first signal data Sa1 and the first audio data Sa2 according to the first communication standard of a first frequency band.

In particular, the wireless audio transmitting device 50 may transmit the first signal data Sa1 through the first channel CH1, and separately transmit the first audio data Sa2 through the second channel CH2.

Accordingly, the first communication module 135*a* in the wireless audio receiving device 100 according to an embodiment of the present disclosure receives the first signal data Sa1 through the first channel CH1, and distinguishes and receives the first audio data Sa2 through the second channel CH2.

Figure 3B:
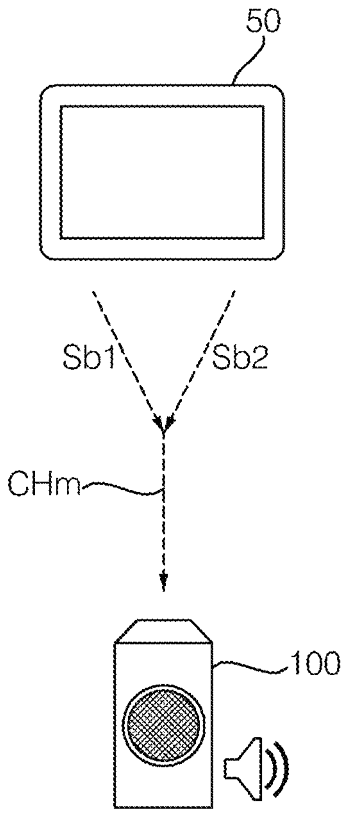

FIG. 3B illustrates that the wireless audio transmitting device 50 outputs the second signal data Sb1 and the second audio data Sb2 to the wireless audio receiving device 100.

Referring to FIG. 3B, the wireless audio transmitting device 50 wirelessly outputs the second signal data Sb1 and the second audio data Sb2 according to the second communication standard of a second frequency band greater than the first frequency band.

In particular, the wireless audio transmitting device 50 may separately transmit the second signal data Sb1 and the second audio data Sb2 through the same channel CHm.

Accordingly, the second communication module 135*b* in the wireless audio receiving device 100 according to an embodiment of the present disclosure separately receives the second signal data Sb1 and the second audio data Sb2 through the same channel CHm.

Meanwhile, the first communication standard may be a Bluetooth communication standard, and the second communication standard may be an ultra-wideband (UWB) communication standard.

For example, the wireless audio transmitting device 50 may wirelessly transmit an audio signal according to the first communication standard, and then wirelessly transmit the audio signal according to the second communication standard when the wireless environment is complicated.

Accordingly, the wireless audio receiving device 100 may stably receive audio wirelessly and output sound even though the wireless environment is complicated. In addition, signal data and audio data can be distinguished in the first communication module 135*a* and the second communication module 135*b*, so that audio can be stably received wirelessly and sound can be output.

Meanwhile, the wireless audio transmitting device 50 according to an embodiment of the present disclosure may include the sound output device 160 that outputs sound, the first communication module 135*a* that wirelessly transmits a first audio signal according to the first communication standard in a first frequency band, and the second communication module 135*b* that wirelessly transmits a second audio signal according to the second communication standard of a second frequency band greater than the first frequency band. The first communication module 135*a* may transmit the first signal data Sa1 through the first channel CH1, and separately transmit the first audio data Sa2 through the second channel CH2, and the second communication module 135*b* may separately transmit the second signal data Sb1 and the second audio data Sb2 through the same channel CHm. Accordingly, it is possible to stably transmit audio wirelessly even in a complicated wireless environment. In addition, signal data and audio data may be transmitted separately.

Meanwhile, the beacon message transmitted from the second communication module 135*b* in the wireless audio transmitting device 50 may include unicast information or broadcast information. Accordingly, it is possible to operate by dividing into unicast and broadcast.

Meanwhile, in response to unicast information being included in the transmitted beacon message, the second communication module 135*b* in the wireless audio transmitting device 50 may receive association request information from the wireless audio receiving device 100, and transmit association response information to the wireless audio receiving device 100. Accordingly, it is possible to operate by dividing into unicast and broadcast. In addition, it is possible to check whether ultra-wideband (UWB) wireless audio support is possible and transmit audio data wirelessly.

Meanwhile, the second communication module 135*b* in the wireless audio transmitting device 50 may add identification information in a media access control (MAC) header or a physical (PHY) header in order to distinguish whether the transmitted second audio signal is the second signal data Sb1 or the second audio data Sb2. Accordingly, it is possible to operate by dividing into unicast and broadcast.

Meanwhile, when the first communication module 135*a* in the wireless audio transmitting device 50 transmits the first audio signal and then the second communication module 135*b* transmits the second audio signal, Host Control Interface (HCl) data of the first communication standard may be mapped to MAC Layer Management Entity (MLME) interface of the second communication standard, and Asynchronous Connection-Less (ACL) data and audio data of the first communication standard may be mapped to a MAC Common Part Sublayer (MCPS) interface of the second communication standard. Accordingly, signal data and audio data can be distinguished, thereby stably transmitting audio wirelessly.

Meanwhile, when the first communication module 135*a* in the wireless audio transmitting device 50 transmits the first audio signal and then the second communication module 135*b* transmits the second audio signal, an adaptation layer (AL) may be used to map data of the first communication standard to data of the second communication standard. Accordingly, signal data and audio data can be distinguished, thereby stably transmitting audio wirelessly.

Meanwhile, when the second communication module 135*b* in the wireless audio transmitting device 50 transmits the second audio signal, it may transmit the second signal data Sb1 in a contention access period (CAP) of the beacon interval PRa, and may transmit the second audio data Sb2 in a contention free period (CFP) of the beacon interval PRa. Accordingly, signal data and audio data can be distinguished, thereby stably transmitting audio wirelessly.

Meanwhile, the first communication module 135*a* in the wireless audio transmitting device 50 may transmit the first signal data Sa1 and transmit identification information in the first signal data Sa1 to the second communication module 135*b*, and the second communication module 135*b* may separately transmit the second signal data Sb1 in the second audio signal, based on the identification information from the first communication module 135*a*. Accordingly, signal data and audio data can be distinguished, thereby stably transmitting audio wirelessly.

Meanwhile, the first communication module 135*a* in the wireless audio transmitting device 50 may transmit the first audio data Sa2 and transmit identification information in the first audio data Sa2 to the second communication module 135*b*, and the second communication module 135*b* may separately transmit the second audio data Sb2 in the second audio signal, based on the identification information from the first communication module 135*a*. Accordingly, signal data and audio data can be distinguished, thereby stably transmitting audio wirelessly.

Meanwhile, the second communication module 135*b* in the wireless audio transmitting device 50 may receive a security activation value from the wireless audio receiving device 100, and if it matches, generate a key, and encrypt and transmit the second audio data Sb2 by using the generated key. Accordingly, it is possible to stably transmit audio wirelessly based on security.

Figure 3C:
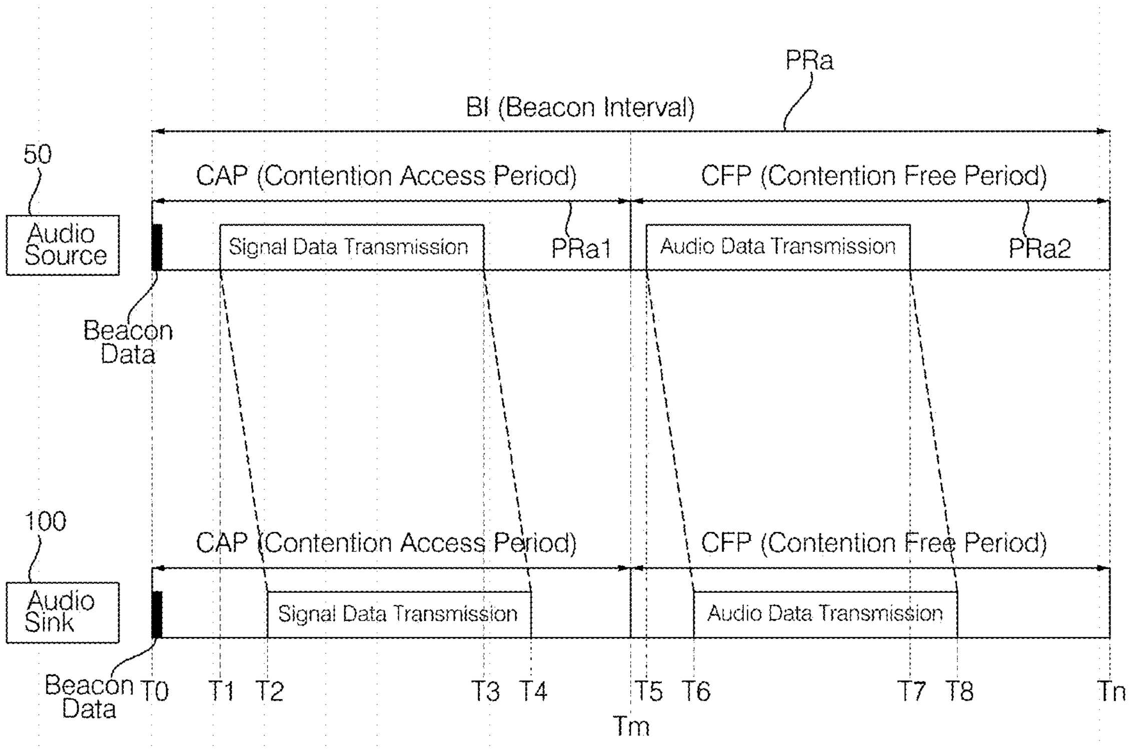

FIG. 3C is a diagram for explaining the operation of the wireless audio transmitting device 50 and the first communication module 135*a* of the wireless audio receiving device 100.

Referring to FIG. 3, the wireless audio transmitting device 50 may wirelessly transmit beacon data at time To during the beacon interval PRa, and the wireless audio receiving device 100 may wirelessly receive the beacon data.

Meanwhile, the wireless audio transmitting device 50 may transmit signal data in a contention access period (CAP) of the beacon interval PRa, and transmit audio data in a contention free period (CFP) of the beacon interval PRa.

In particular, FIG. 3 illustrates that signal data is transmitted between time T1 and time T3 within a contention access period (CAP), and audio data is transmitted between time T5 and time T7 within a contention free period (CFP).

In response, the wireless audio receiving device 100 may receive signal data between time T2 and time T4 within a contention access period (CAP), and may receive audio data between time T6 and time T8 within a contention free period (CFP).

That is, when the second communication module 135*b* in the wireless audio receiving device 100 receives the second audio signal, it may receive the second signal data Sb1 in the contention access period (CAP) of the beacon interval PRa, and may receive the second audio data Sb2 in the contention free period (CFP) of the beacon interval PRa. Accordingly, signal data and audio data can be distinguished, thereby stably receiving audio wirelessly and outputting sound.

Figure 4:
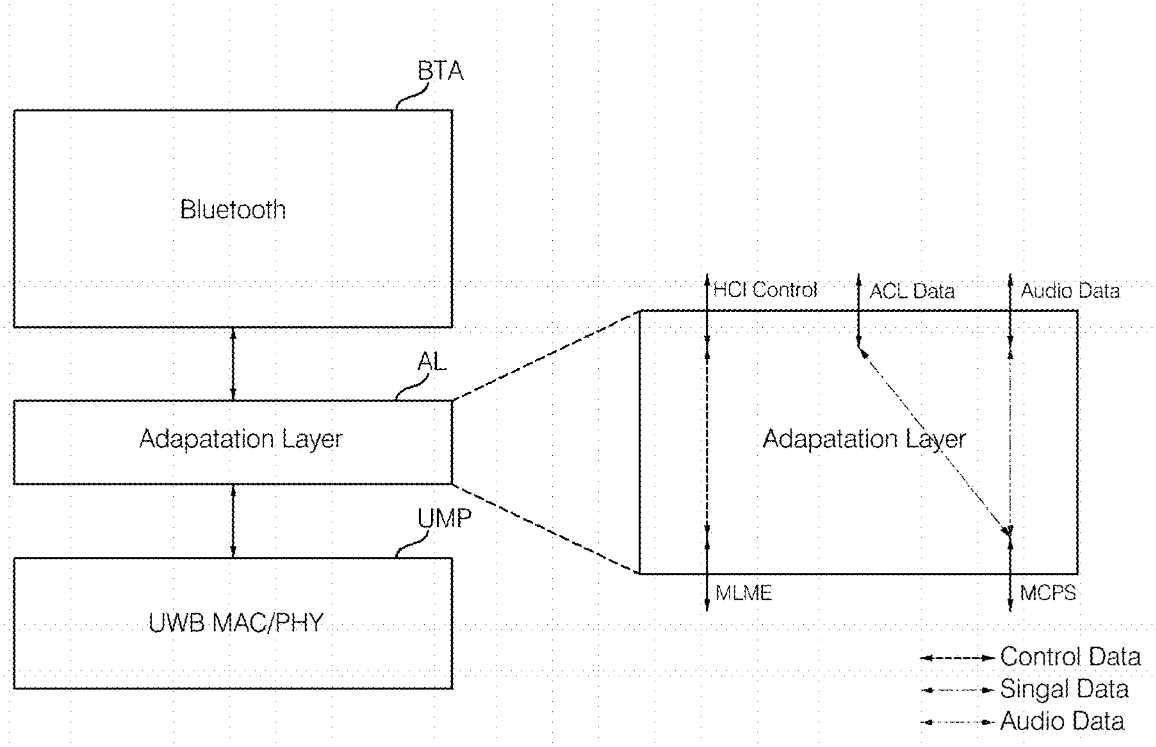

FIG. 4 is a diagram for explaining mapping between the first communication standard and the second communication standard.

Referring to FIG. 4, in order to provide a UWB audio service which is an example of the second communication standard, Bluetooth audio, which is an example of the first communication standard optimized for the audio service, is adopted as an upper protocol.

Bluetooth audio (BTA) interface is composed of HCl Control, ACL Data, and Audio Data.

Meanwhile, the Media access control or physical layer (MAC/PHY) (UMP) of UWB may have a MAC Layer Management Entity (MLME) interface and a MAC Common Part Sublayer (MCPS) interface.

Meanwhile, for mapping between Bluetooth audio (BTA) and UWB media access control or a physical layer (MAC/PHY) (UMP), an adaptation layer (AL) is utilized in an embodiment of the present disclosure.

In the adaptation layer (AL), Host Control Interface (HCl) data of the first communication standard may be mapped to MAC Layer Management Entity (MLME) interface of the second communication standard, and Asynchronous Connection-Less (ACL) data and audio data of the first communication standard may be mapped to a MAC Common Part Sublayer (MCPS) interface of the second communication standard.

Meanwhile, UWB wireless transmission or UWB wireless reception has a frequency band 3.1 GHz to 10.6 GHz different from the unlicensed band 2.4 GHz, thereby avoiding frequency interference with other wireless devices using the unlicensed band, and solving problems such as audio interruption.

In addition, since UWB wireless transmission or UWB wireless reception provides a higher PHY data rate than Bluetooth wireless transmission or wireless reception, high-quality audio service is possible.

Meanwhile, when the first communication module 135*a* receives the first audio signal and then the second communication module 135*b* receives the second audio signal, Host Control Interface (HCl) data of the first communication standard may be mapped to the MAC Layer Management Entity (MLME) interface of the second communication standard, and Asynchronous Connection-Less (ACL) data and audio data of the first communication standard may be mapped to the MAC Common Part Sublayer (MCPS) interface of the second communication standard. Accordingly, signal data and audio data can be distinguished, thereby stably receiving audio wirelessly and outputting sound.

Meanwhile, when the first communication module 135*a* receives the first audio signal and then the second communication module 135*b* receives the second audio signal, data of the first communication standard may be mapped to data of the second communication standard by using an adaptation layer AL. Accordingly, signal data and audio data can be distinguished, thereby stably receiving audio wirelessly and outputting sound.

Figure 5A:
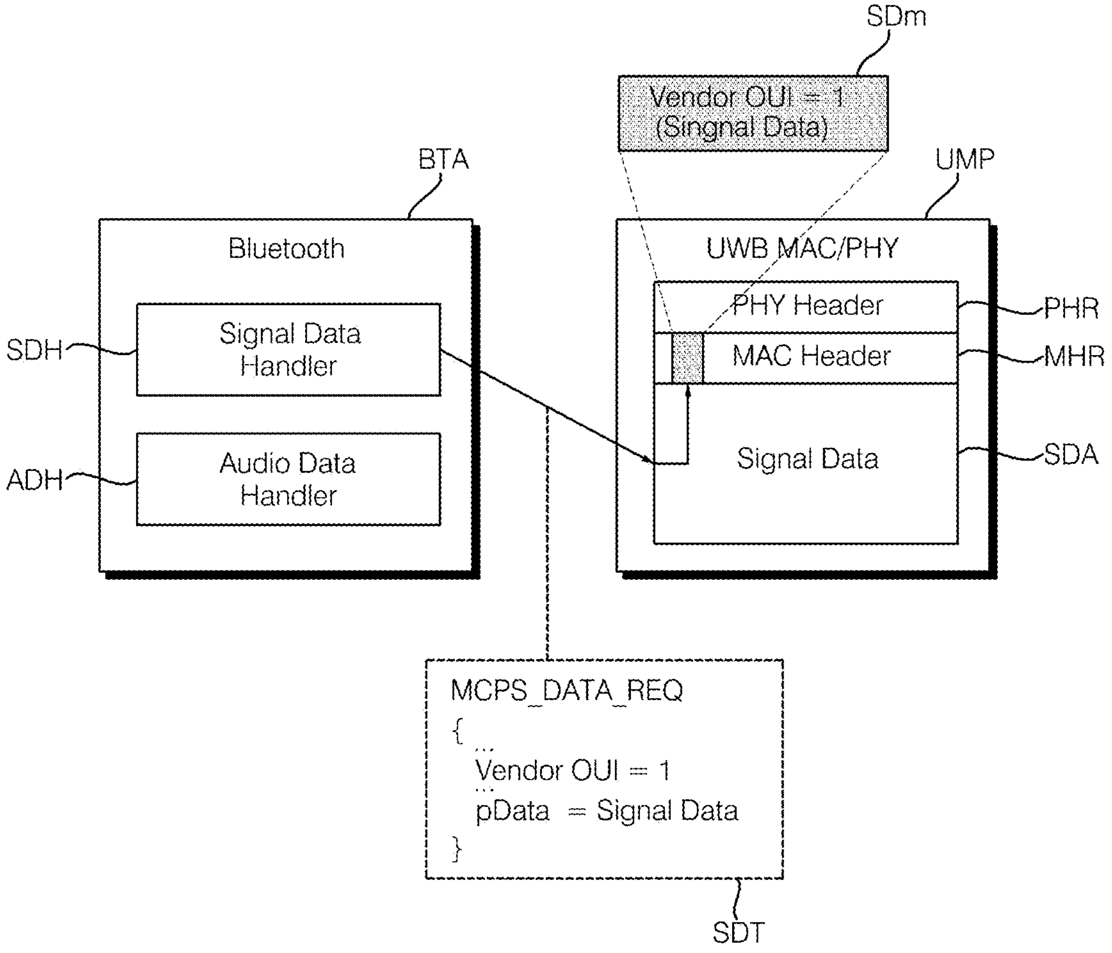
Figure 5B:
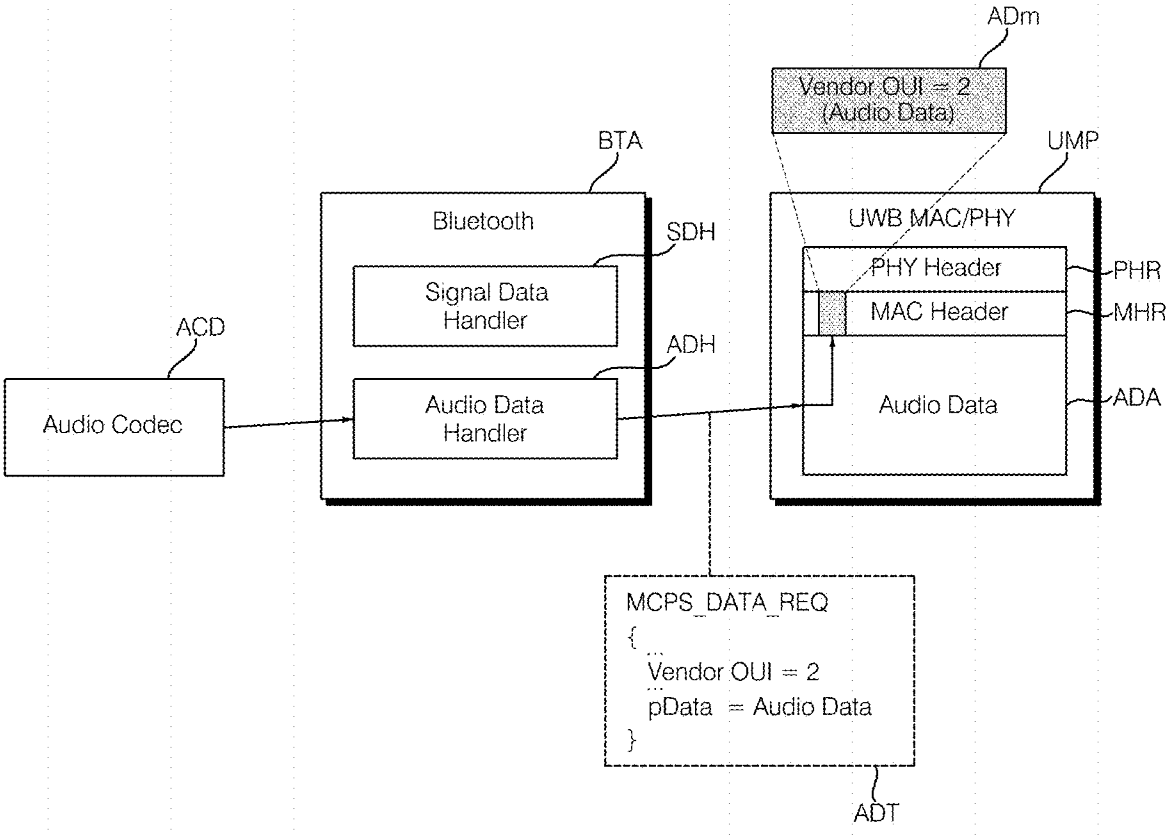

FIGS. 5A and 5B are diagrams for explaining an operation of a wireless audio transmitting device.

Referring to the drawing, the signal data handler SDH in the Bluetooth audio BTA of the wireless audio transmitting device 50 may define an identifier for distinguishing between signal data and audio data by using the Vendor OUI Field of the UWB MAC Header.

FIG. 5A illustrates signal data SDT when the Vendor OUI is '1', and FIG. 5B illustrates audio data ADT when the Vendor OUI is '2'.

In particular, the Bluetooth audio BTA of the wireless audio transmitting device 50 may transmit signal data SDT for codec and QoS configuration used in the UWB audio service.

Meanwhile, when the wireless audio transmitting device 50 transmits the signal data SDT to the Media access control or physical layer (MAC/PHY) (UMP) of UWB, Vendor OUI, which is UWB MAC Header, may be set to '1' and transmitted.

Meanwhile, in the wireless audio receiving device 100, when codec and QoS configuration are completed, audio data may be transmitted from the audio codec to Bluetooth audio BTA, and Bluetooth Audio BTA may be transmitted to the Media access control or physical layer (MAC/PHY) (UMP) of UWB by setting the Vendor OUI, which is UWB MAC Header, to '2'.

In addition, the wireless audio transmitting device 50 may transmit audio data to the wireless audio receiving device 100 with respect to Media access control or physical layer (MAC/PHY) (UMP) of UWB. Accordingly, even though the wireless environment is complicated, it is possible to stably receive audio wirelessly and output sound.

Figure 6A:
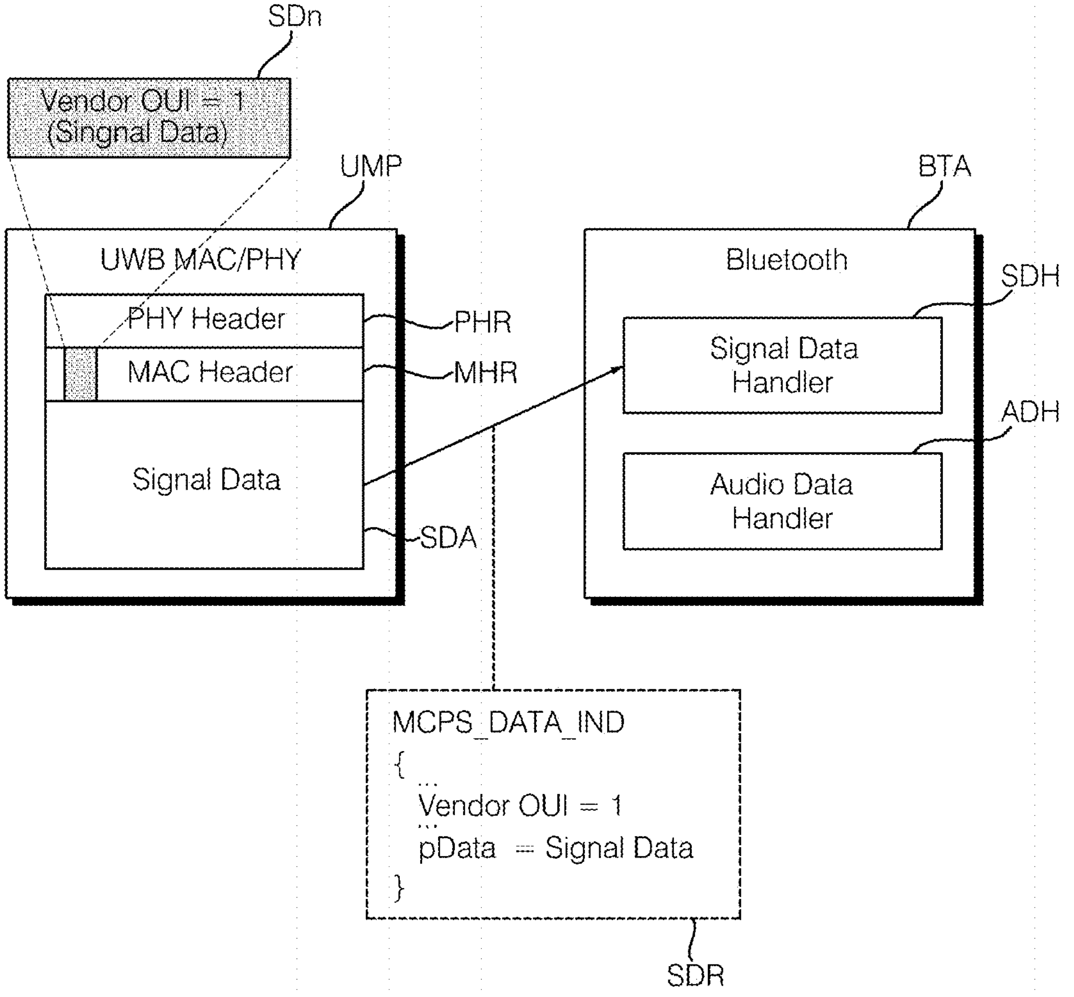
Figure 6B:
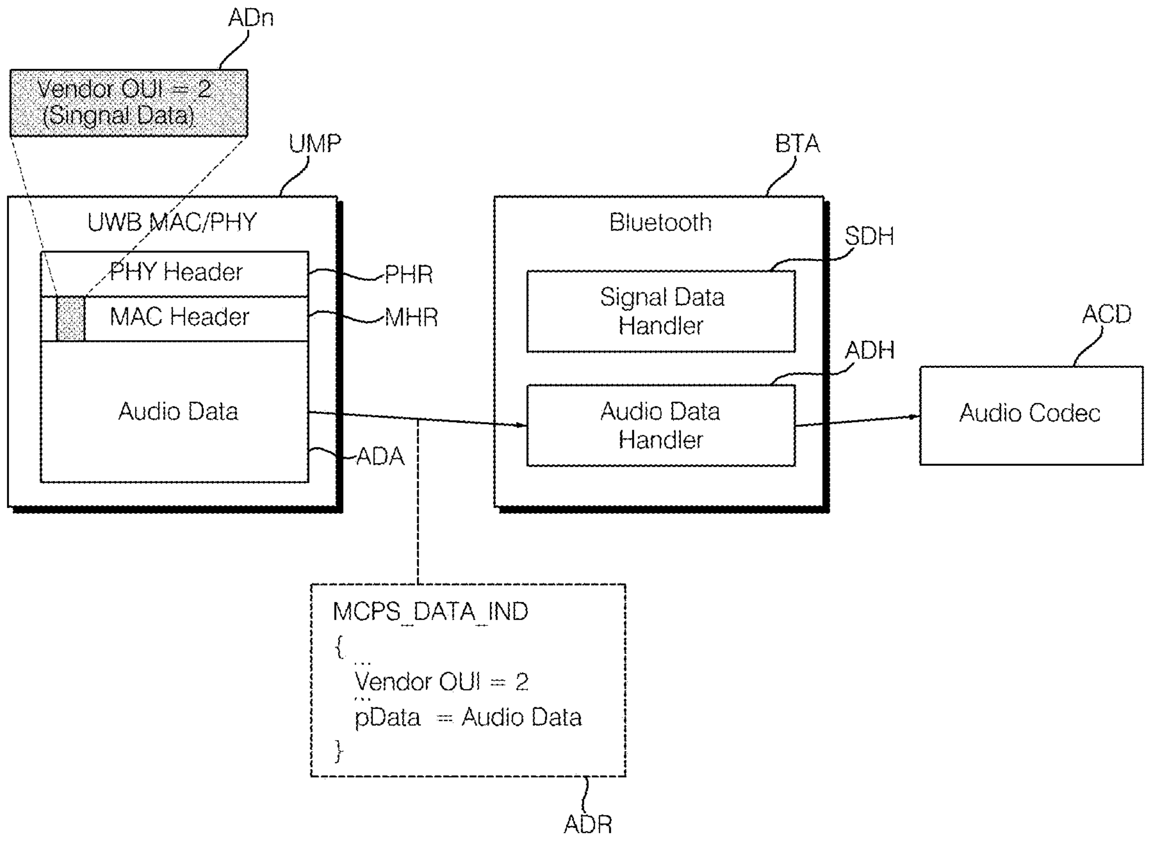

FIGS. 6A and 6B are diagrams for explaining an operation of a wireless audio receiving device.

Referring to the drawing, an identifier for distinguishing between signal data and audio data of Bluetooth audio (BTA) may be defined through the MCPS interface of the wireless audio receiving device 100.

FIG. 6A illustrates signal data SDR when the Vendor OUI is '1', and FIG. 6B illustrates audio data ADR when the Vendor OUI is '2'.

When the Media access control or physical layer (MAC/PHY) (UMP) of UWB of the wireless audio receiving device 100 receives data having Vendor OUI, which is the UWB MAC Header, that is set to '1', Bluetooth audio BTA may move to the signal data handler SDH.

In particular, the Bluetooth audio BTA of the wireless audio receiving device 100 may receive codec and QoS information used in the UWB audio service through a signal data handler SDH, and set information necessary for audio data reception.

Meanwhile, when the codec and QoS configuration for UWB audio service are completed, data whose Vendor OUI, which is the UWB MAC Header, is '2' is received, and Bluetooth audio BTA may move to the audio data handler ADH.

The Bluetooth audio BTA sets a reproducing time for audio data received through an audio data handler (ADH), and the audio data having set reproducing time is transmitted to an audio codec. Accordingly, even though the wireless environment is complicated, it is possible to stably receive audio wirelessly and output sound.

Figure 7:
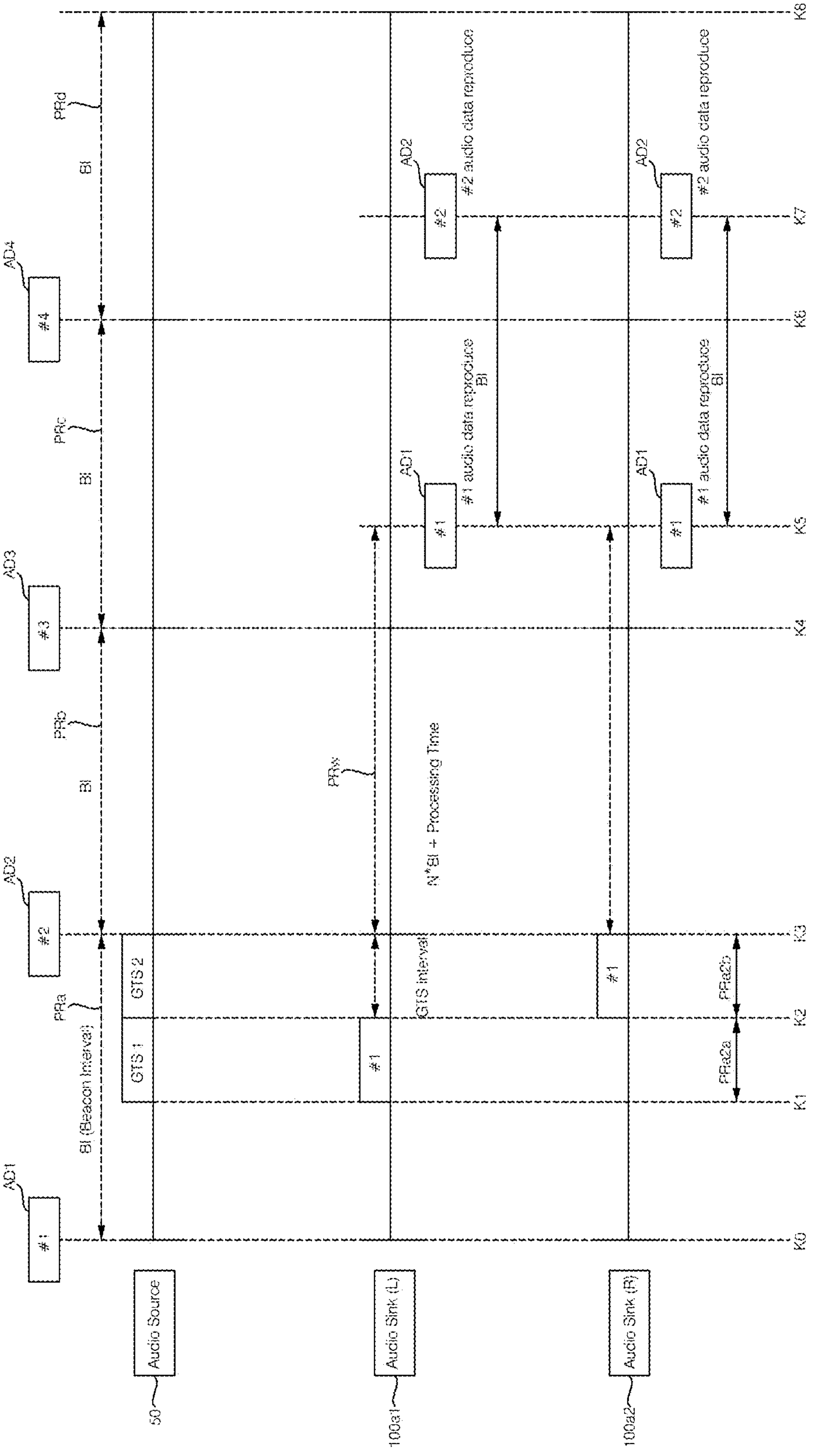

FIG. 7 is a diagram for explaining an UWB audio reproducing time synchronization.

Referring to FIG. 7, the wireless audio transmitting device 50 may sequentially transmit first to fourth audio data AD1 to AD4 to a plurality of wireless audio receiving devices 100*a*1 and 100*a*2 respectively.

In particular, the wireless audio transmitting device 50 may sequentially transmit the first to fourth audio data AD1 to AD4 for each channel in a beacon interval.

FIG. 7 illustrates that a first audio data AD1 is generated at time K0, transmitted to a first wireless audio receiving device 100*a*1 in an interval PRa2*a* between time K1 and time K2, and transmitted to a second wireless audio receiving device 100*a*2 in an interval PRa2*b* between time K2 and time K3.

Meanwhile, the interval PRa2*a* and the interval PRa2*b* may be set respectively by a plurality of wireless audio receiving devices 100*a*1 and 100*a*2 that receive audio data.

Similarly, at time K3, a second audio data AD2 is generated, and transmitted to the first wireless audio receiving device 100*a*1 and the second wireless audio receiving device 100*a*2, within a second beacon interval PRb.

Similarly, at time K4, a third audio data AD3 is generated, and transmitted to the first wireless audio receiving device 100*a*1 and the second wireless audio receiving device 100*a*2, within a third beacon interval PRc.

Similarly, at time K6, a fourth audio data AD4 is generated, and transmitted to the first wireless audio receiving device 100*a*1 and the second wireless audio receiving device 100*a*2, within a fourth beacon interval PRd.

Meanwhile, in order to synchronize and reproduce the first audio data AD1 received in a first beacon interval PRa in the plurality of wireless audio receiving devices 100*a*1 and 100*a*2, it is preferable that it is not reproduced in a second beacon interval PRb, but reproduced at the time K5 in the third beacon interval PRc.

That is, after audio data is reproduced, it is preferable that it is reproduced not in the next beacon interval but in the beacon interval after next.

Meanwhile, it is preferable that the interval PRw from the audio data reception completion time K3 to the reproducing start point K5 is greater than the length of the beacon interval. Accordingly, it is possible to stably synchronize and reproduce audio data.

Meanwhile, after the first audio data AD1 is reproduced at the time K5, it is preferable that the second audio data AD2 is spaced apart by the beacon interval and reproduced at the time K7. Accordingly, it is possible to stably synchronize and reproduce audio data.

Figure 8A:
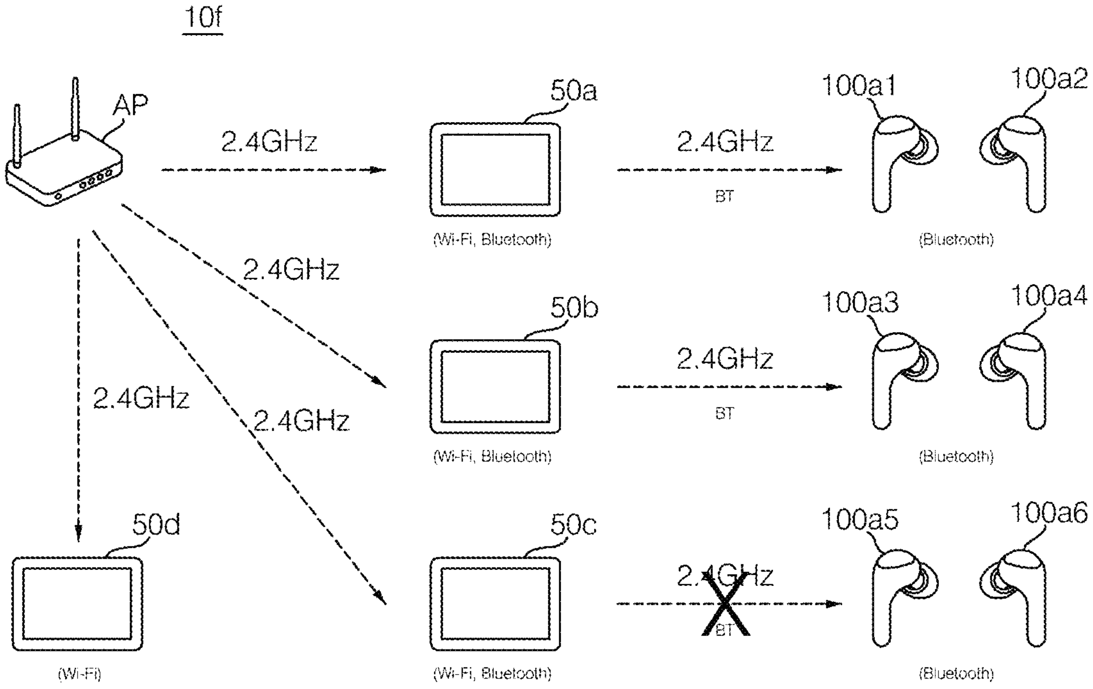
Figure 8B:
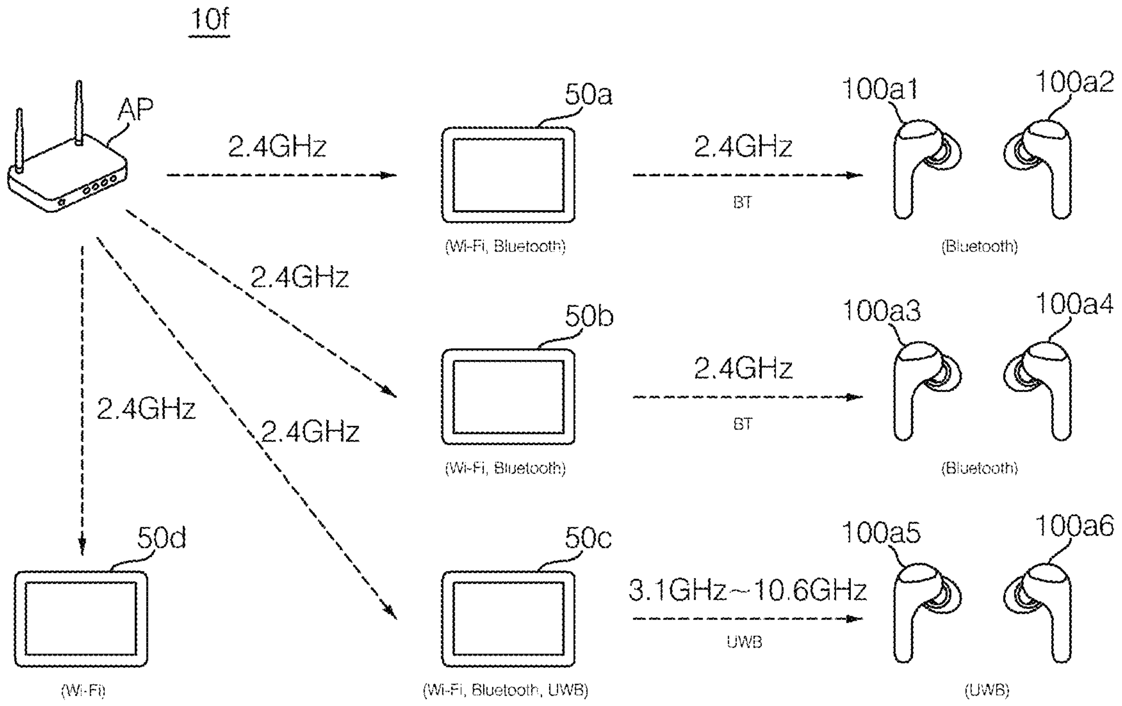

FIGS. 8A and 8B illustrate a wireless audio system 10*f* including an AP device (AP), a plurality of wireless audio transmitting devices 50*a* to 50*d*, and a plurality of wireless audio receiving devices 100*a*1 to 100*a*6.

As shown in FIG. 8A, in a complicated wireless environment, between the plurality of wireless audio transmitting devices 50*a* to 50*d* and the plurality of wireless audio receiving devices 100*a*1 to 100*a*6, when audio is transmitted wirelessly by using Bluetooth communication which is the same first communication standard, audio data transmission becomes impossible due to frequency interference.

FIG. 8A illustrates that audio data transmission is impossible due to frequency interference, between a third wireless audio transmitting device 50*c* and the plurality of wireless audio receiving devices 100*a*5 to 100*a*6.

In order to solve this problem, an embodiment of the present disclosure utilizes the second communication standard having a larger frequency band and a larger bandwidth than the first communication standard. The second communication standard may be UWB.

As shown in FIG. 8B, in a complicated wireless environment, it is preferable that among a plurality of wireless audio transmitting devices 50*a* to 50*d* and a plurality of wireless audio receiving devices 100*a*1 to 100*a*6, devices excluding the third wireless audio transmitting device 50*c* and the plurality of wireless audio receiving devices 100*a*5 to 100*a*6 use Bluetooth communication which is the first communication standard, and the third wireless audio transmitting device 50*c* and the plurality of wireless audio receiving devices 100*a*5 to 100*a*6 use UWB communication. Accordingly, it is possible to stably transmit and receive wireless audio data even in a complicated wireless environment.

Figure 9A:
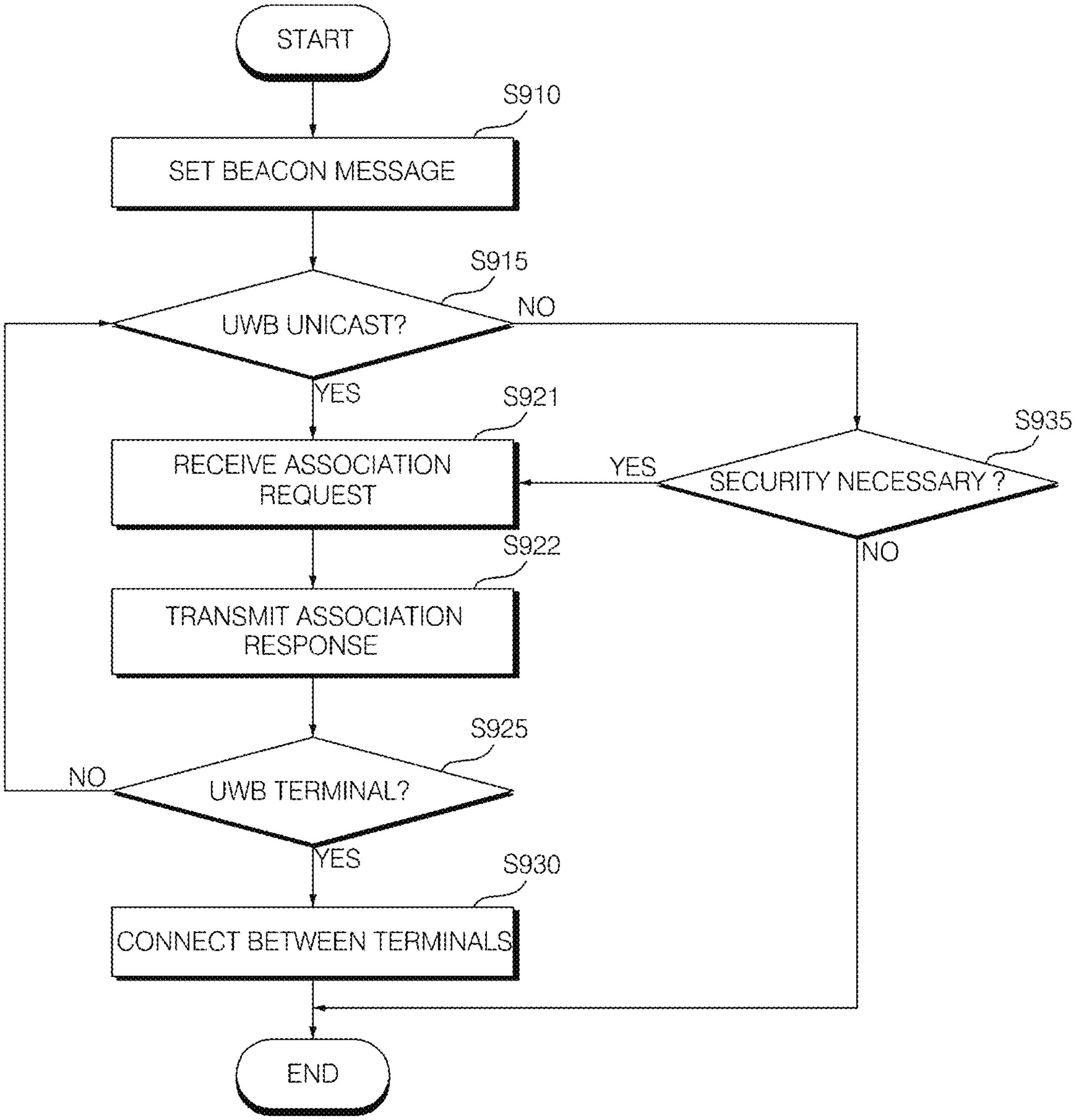
FIG. 9A is an example of a flowchart showing a method of operating a wireless audio transmitting device according to an embodiment of the present disclosure.

FIG. 9A is an example of a flowchart showing a method of operating a wireless audio transmitting device according to an embodiment of the present disclosure.

Referring to FIG. 9A, the wireless audio transmitting device 50 according to an embodiment of the present disclosure sets an audio service in a beacon message (S910).

The wireless audio transmitting device 50 may transmit audio service setting information to the surrounding wireless audio receiving device 100 after setting.

Next, the wireless audio transmitting device 50 may check whether the UWB unicast method is used (S915), and if applicable, proceed with the unicast method, and if not, proceed with the broadcast method.

When using the broadcast method, the wireless audio transmitting device 50 may determine whether security is necessary and, if necessary, proceed to step 921 (S921).

Next, the wireless audio transmitting device 50 may receive association request information from the wireless audio receiving device 100 (S921), and transmit association response information to the wireless audio receiving device 100 in response to an association request (S922).

Meanwhile, the wireless audio transmitting device 50 determines whether the wireless audio receiving device 100 is a UWB terminal that supports UWB (S925), and, if applicable, connects to the wireless audio receiving device 100 (S930).

Accordingly, the wireless audio transmitting device 50 can wirelessly transmit audio data to the wireless audio receiving device 100 according to UWB which is the second communication standard.

Figure 9B:
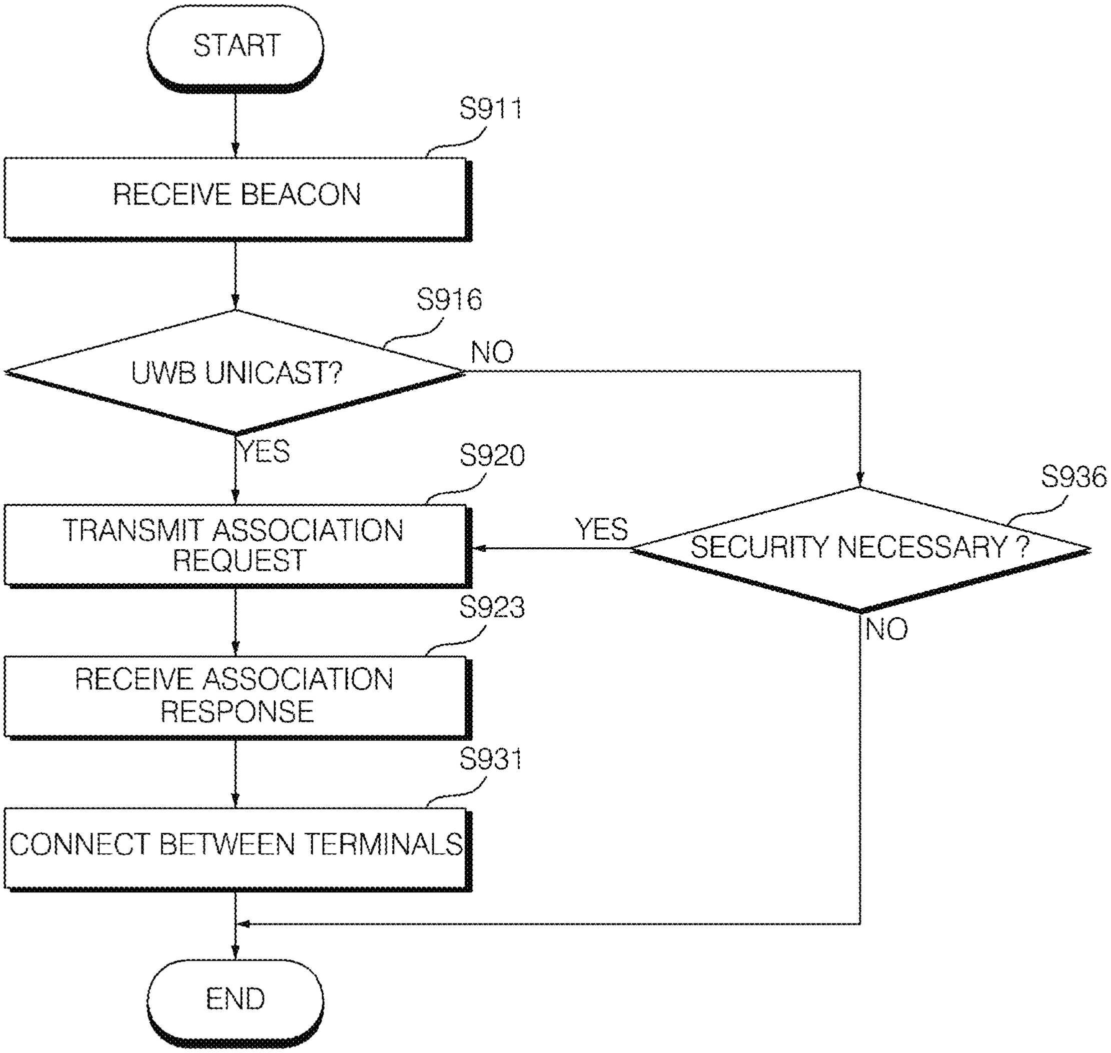
FIG. 9B is an example of a flowchart showing a method of operating a wireless audio receiving device according to an embodiment of the present disclosure.

FIG. 9B is an example of a flowchart showing a method of operating a wireless audio receiving device according to an embodiment of the present disclosure.

Referring to FIG. 9B, the wireless audio receiving device 100 according to an embodiment of the present disclosure receives a beacon message from the wireless audio transmitting device 50 (S911).

The wireless audio receiving device 100 checks the received beacon message and examines whether it is a UWB unicast method (S916), and if applicable, proceeds in the unicast method, and if not applicable, proceeds in the broadcast method.

When using the broadcast method, the wireless audio receiving device 100 may determine whether security is necessary and, if necessary, proceed to step 920 (S920).

Next, the wireless audio receiving device 100 may transmit association request information to the wireless audio transmitting device 50 (S923), and receive association response information from the wireless audio transmitting device 50 in response to an association request (S923).

Meanwhile, the wireless audio receiving device 100 is connected to the wireless audio transmitting device 50 (S931).

Accordingly, the wireless audio receiving device 100 can wirelessly receive audio data from the wireless audio transmitting device 50 according to UWB which is the second communication standard.

Figure 9C:
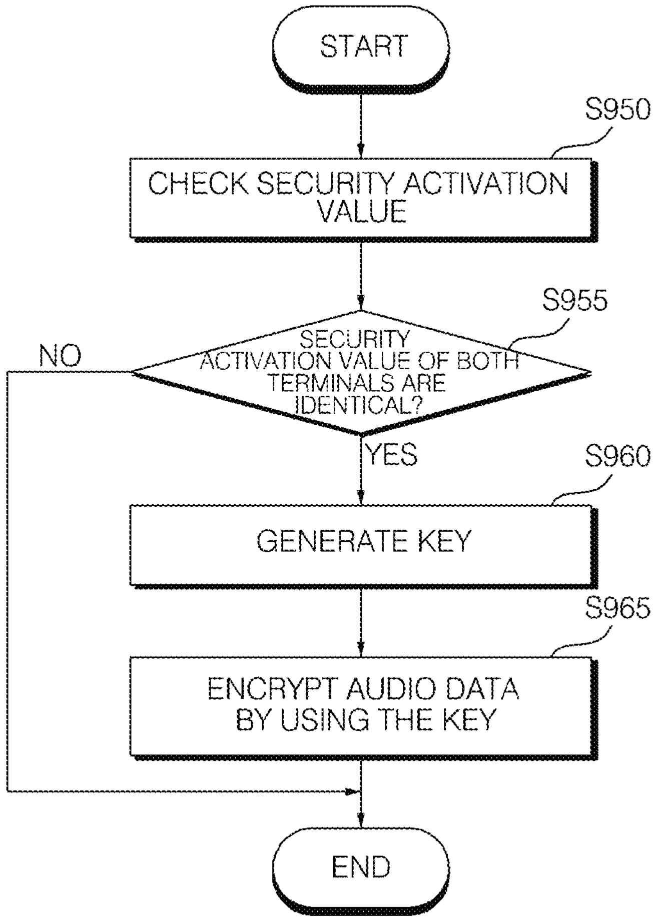
FIG. 9C is another example of a flowchart showing a method of operating a wireless audio transmitting device according to an embodiment of the present disclosure.

FIG. 9C is another example of a flowchart showing a method of operating a wireless audio transmitting device according to an embodiment of the present disclosure.

Referring to FIG. 9C, the wireless audio transmitting device 50 checks a security activation value (S950).

For example, the wireless audio transmitting device 50 may receive the security activation value from the wireless audio receiving device 100 and check it.

Specifically, the wireless audio transmitting device 50 may check the PIB_macSecurityEnabled value, which is a security activation value, from UWB media access control or physical layer (MAC/PHY) (UMP).

Next, the wireless audio transmitting device 50 compares its own security activation value and the received security activation value to determine whether both values are identical with each other (S955).

And, when its own security activation value and the received security activation value are identical with each other, the wireless audio transmitting device 50 generates a key (S960).

Next, the wireless audio transmitting device 50 encrypts the generated audio data by using the generated key and transmits it (S965).

In particular, the wireless audio transmitting device 50 may encrypt audio data transmitted to the UWB media access control or physical layer (MAC/PHY) (UMP) by using the generated key. Accordingly, transmission of audio data having a high security level becomes possible.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. A wireless audio receiving device comprising:

a first communication module configured to wirelessly receive a first audio signal based on a first communication standard of a first frequency band;

a second communication module configured to wirelessly receive a second audio signal based on a second communication standard of a second frequency band greater than the first frequency band; and a sound output device configured to output a first sound corresponding to the first audio signal from the first communication module or a second sound corresponding to the second audio signal from the second communication module, wherein the first communication module is configured to receive first signal data through a first channel, and separately receive first audio data through a second channel, wherein the second communication module is configured to receive second signal data and second audio data separately through the same channel, and wherein, in response to receiving the first audio signal from the first communication module and then receiving the second audio signal from the second communication module, data of the first communication standard is mapped to data of the second communication standard by using an adaptation layer.

2. The wireless audio receiving device of claim 1, wherein a beacon message received from the second communication module includes unicast information or broadcast information.

3. The wireless audio receiving device of claim 2, wherein in response to unicast information being included in the received beacon message, the second communication module is configured to transmit association request information to a wireless audio transmitting device, and receive association response information from the wireless audio transmitting device.

4. The wireless audio receiving device of claim 1, wherein the second communication module is configured to distinguish the second signal data and the second audio data, based on identification information in a header among the received second audio signal.

5. The wireless audio receiving device of claim 1, wherein the second communication module is configured to distinguish the second signal data or the second audio data, based on identification information in a media access control header or a physical header among the received second audio signal.

6. A wireless audio receiving device comprising:

a first communication module configured to wirelessly receive a first audio signal based on a first communication standard of a first frequency band;

a second communication module configured to wirelessly receive a second audio signal based on a second communication standard of a second frequency band greater than the first frequency band; and a sound output device configured to output a first sound corresponding to the first audio signal from the first communication module or a second sound corresponding to the second audio signal from the second communication module, wherein the first communication module is configured to receive first signal data through a first channel, and separately receive first audio data through a second channel, wherein the second communication module is configured to receive second signal data and second audio data separately through the same channel, and wherein the second communication module is configured to, in response to receiving the second signal data, extract encoding or decoding information of the second standard, receive the second audio data after the second signal data, and set a play time of the second audio data, based on the extracted encoding or decoding information.

7. The wireless audio receiving device of claim 6, further comprising a processor configured to reproduce an audio signal from the first communication module or the second communication module, wherein the processor is configured to reproduce the second audio data, based on decoding information and a set play time from the second communication module.

8. The wireless audio receiving device of claim 1, wherein in response to receiving the first audio signal from the first communication module and then receiving the second audio signal from the second communication module, Host Control Interface (HCI) data of the first communication standard is mapped to a MAC Layer Management Entity (MLME) interface of the second communication standard, and Asynchronous Connection-Less (ACL) data and audio data of the first communication standard are mapped to a MAC Common Part Sublayer (MCPS) interface of the second communication standard.

9. The wireless audio receiving device of claim 1, wherein in response to receiving the second audio signal, the second communication module is configured to receive the second signal data in a contention access period of a beacon interval, and receive the second audio data in a contention free period of the beacon period.

10. A wireless audio transmitting device comprising:

a first communication module configured to wirelessly transmit a first audio signal based on a first communication standard of a first frequency band; and a second communication module configured to wirelessly transmit a second audio signal based on a second communication standard of a second frequency band greater than the first frequency band, wherein the first communication module is configured to transmit first signal data through a first channel, and separately transmit first audio data through a second channel, wherein the second communication module is configured to transmit second signal data and second audio data separately through the same channel, and wherein, in response to transmitting the first audio signal from the first communication module and then transmitting the second audio signal from the second communication module, data of the first communication standard is mapped to data of the second communication standard by using an adaptation layer.

11. The wireless audio transmitting device of claim 10, wherein a beacon message transmitted from the second communication module includes unicast information or broadcast information.

12. The wireless audio transmitting device of claim 11, wherein in response to unicast information being included in the transmitted beacon message, the second communication module is configured to receive association request information from a wireless audio receiving device, and transmit association response information to the wireless audio receiving device.

13. The wireless audio transmitting device of claim 10, wherein the second communication module adds identification information within a media access control header or a physical header to distinguish whether the transmitted second audio signal is the second signal data or the second audio data.

14. The wireless audio transmitting device of claim 10, wherein in response to transmitting the first audio signal from the first communication module and then transmitting the second audio signal from the second communication module, Host Control Interface (HCI) data of the first communication standard is mapped to a MAC Layer Management Entity (MLME) interface of the second communication standard, and Asynchronous Connection-Less (ACL) data and audio data of the first communication standard are mapped to a MAC Common Part Sublayer (MCPS) interface of the second communication standard.

15. The wireless audio transmitting device of claim 10, wherein in response to transmitting the second audio signal, the second communication module is configured to transmit the second signal data in a contention access period of a beacon interval, and transmit the second audio data in a contention free period of the beacon interval.

16. The wireless audio transmitting device of claim 10, wherein in response to receiving a security activation value from a wireless audio receiving device and if it matches, the second communication module is configured to generate a key, and encrypt and transmit the second audio data by using the generated key.

17. A wireless audio output system comprising:

a wireless audio receiving device; and a wireless audio transmitting device configured to transmit an audio signal to the wireless audio receiving device, wherein the wireless audio receiving device comprises:

a first communication module configured to wirelessly receive a first audio signal based on a first communication standard of a first frequency band;

a second communication module configured to wirelessly receive a second audio signal based on a second communication standard of a second frequency band greater than the first frequency band; and a sound output device configured to output a first sound corresponding to the first audio signal from the first communication module or a second sound corresponding to the second audio signal from the second communication module, wherein the first communication module is configured to receive first signal data through a first channel, and separately receive first audio data through a second channel, wherein the second communication module is configured to receive second signal data and second audio data separately through the same channel, wherein the wireless audio transmitting device comprises:

a third communication module configured to wirelessly transmit the first audio signal based on the first communication standard of the first frequency band; and a fourth communication module configured to wirelessly transmit the second audio signal based on the second communication standard of the second frequency band greater than the first frequency band, wherein the third communication module is configured to transmit the first signal data through the first channel, and separately transmit the first audio data through the second channel, and wherein the fourth communication module is configured to transmit the second signal data and the second audio data separately through the same channel.

* * * * *